United States Patent
Dykstra et al.

(10) Patent No.: US 11,721,147 B2
(45) Date of Patent: Aug. 8, 2023

(54) SYSTEM AND METHOD FOR MANAGING AN AUTONOMOUS LICENSING ENTITY

(71) Applicant: LOYALTY IOT, INC., Reno, NV (US)

(72) Inventors: Jebb A. Dykstra, Santa Monica, CA (US); Michael A. Kerr, Reno, NV (US)

(73) Assignee: LOYALTY IOT, INC., Reno, NV (US)

( * ) Notice: Subject to any disclaimer, the term of this patent is extended or adjusted under 35 U.S.C. 154(b) by 0 days.

(21) Appl. No.: 17/520,417

(22) Filed: Nov. 5, 2021

(65) Prior Publication Data
US 2022/0254206 A1 Aug. 11, 2022

(51) Int. Cl.
| | |
|---|---|
| G07C 9/00 | (2020.01) |
| G07C 9/28 | (2020.01) |
| G06Q 50/30 | (2012.01) |
| G07C 9/27 | (2020.01) |
| G06F 21/10 | (2013.01) |
| H04L 9/40 | (2022.01) |

(52) U.S. Cl.
CPC ......... *G07C 9/00309* (2013.01); *G06Q 50/30* (2013.01); *G07C 9/27* (2020.01); *G07C 9/28* (2020.01); *G06F 21/10* (2013.01); *G06Q 2240/00* (2013.01); *G07C 2009/00769* (2013.01); *H04L 63/10* (2013.01)

(58) Field of Classification Search
CPC .............. G07C 9/00309; G07C 9/28; G07C 2009/00769; G06F 21/10; G06Q 50/30; G06Q 2240/00; H04L 63/10
See application file for complete search history.

(56) References Cited

U.S. PATENT DOCUMENTS

| | | | |
|---|---|---|---|
| 9,071,606 B2 | 6/2015 | Braun et al. | |
| 2004/0162905 A1 | 8/2004 | Griffin et al. | |
| 2007/0094145 A1 | 4/2007 | Ta et al. | |
| 2008/0147745 A1 | 6/2008 | Wilkinson et al. | |
| 2011/0026898 A1 | 2/2011 | Lussier et al. | |
| 2011/0125599 A1 | 5/2011 | Morin et al. | |
| 2011/0264621 A1 | 10/2011 | Burjoski | |
| 2013/0091209 A1 | 4/2013 | Bennett et al. | |
| 2013/0217359 A1 | 8/2013 | Cherian et al. | |
| 2014/0280932 A1* | 9/2014 | Braun ............... | H04L 63/10 709/225 |
| 2016/0071333 A1 | 3/2016 | Haidar et al. | |
| 2018/0191722 A1 | 7/2018 | Barnes et al. | |

(Continued)

*Primary Examiner* — Tonia L Dollinger
*Assistant Examiner* — Joseph M Cousins
(74) *Attorney, Agent, or Firm* — Kerr IP Group, LLC

(57) ABSTRACT

A system and method for managing a vehicle cloud service are disclosed. The system utilizes a cloud management module that transmits vehicle access invitations to end users according to an authentication performed by a third-party cloud service. The third-party cloud service authenticates end users requesting vehicle access through an identifying message transmitted by the end user's wireless mobile client device. The identifying message includes identifying information, such as a user profile having a plurality of user preferences and at least one user credential indicating the end user has a valid driving license. A synchronization module synchronizes directory services for one or more cloud services including the vehicle cloud service.

20 Claims, 14 Drawing Sheets

(56) References Cited

U.S. PATENT DOCUMENTS

2020/0242212 A1    7/2020  Gibb
2020/0249822 A1*   8/2020  Penilla .................... H04W 4/44
2022/0240064 A1*   7/2022  Zuniga .................. H04L 9/0866

* cited by examiner

SYSTEM AND METHOD FOR MANAGING AN AUTONOMOUS LICENSING ENTITY

FIELD

The description relates to a system and method for managing an autonomous licensing entity. More specifically, the description relates to a system and method for controlling seat licensing levels of a fleet of electronically accessible vehicles to autonomous entities. Further, the description relates to managing access to unlockable features of the fleet of electronically accessible vehicles through data brokering. The autonomous entity covers all types of self-governing end users including people, artificial intelligence (AI), and hybrids in a shared infrastructure of metered or non-metered usage of multiple cloud services.

BACKGROUND

Traditional infrastructure involves an endpoint, which is a computing device with an interactive screen known as a mediator with a graphical user interface (GUI). An autonomous entity embodied as a natural intelligence (human user) interacts with the endpoint through physical gestures (e.g., typing, swiping, scrolling). However, embodiments of autonomous entities further comprise self-governing end users such as people, artificial intelligence (AI), and hybrids. Thus, an autonomous entity might not need to be required to type, swipe or scroll in order to interact with another autonomous entity. Furthermore, conventional forms of payment might not be required from autonomous entities in a shared infrastructure with per-seat licensing.

The migration to cloud computing for enterprise solutions has created some unique challenges that relate to managing "per-seat licenses" for autonomous entities. For example, there are various limitations associated with the System Administrator controlling or managing the per seat licensing in a cloud-based enterprise software implementation. The limitations include determining which endpoints are going to access the licensed service, at which times those endpoints access the licensed service, and minimizing the need for a System Administrator. Further, controlling seat licensing levels for a service provided through a predetermined number of physical interfaces, such as for example, a fleet of vehicles, a set of smartphones, or a set of tablets requires additional management to prevent an otherwise non-metered service from double-booking a single physical interface.

Fundamentally, automotive endpoint security requires protecting communications, authenticating communications, cryptographic operations (e.g., encrypting data, encryption, decryption, hashing), and simplified system integration of the automotive security solution. Most of the automotive security systems rely on public-key infrastructure (PKI) solutions. Although PKI solutions are effective, there are also various challenges with implementing PKI systems in an automotive environment.

The PKI challenges include using outdated security protocols, using keys that are too short (i.e., short keys), using self-issued keys and certificates, unsecured storage of keys and certificates, and lack of a rotation strategy for PKI certificates, keys, and/or established cryptoperiods. Also, there is the fundamental challenge of establishing trust in the Certificate Authority ("CA"), which issues the trusted digital certificates. PKI is susceptible to phishing and certificate code-signing issues. Phishing is the process of gaining login information or other vital authentication information from a user through social engineering. Phishing enables malicious actors to gain access to secured information through stolen or weak user credentials. Three certificate code-signing issues arise with PKI: (1) publisher-side key mishandling—keys are issued to a business, but not kept track of; (2) insufficient client-side safeguards—malicious actors copy the certificate to pierce antivirus software; and (3) certificate authority-side verification failure—certificates are issued to malicious actors.

Thus, there is a need for a system and method that minimizes the risks associated with PKI challenges and trusting the Certificate Authority for automotive endpoint authentication.

SUMMARY

A system for managing a vehicle cloud service is described. The system includes the vehicle cloud service, a third-party network component, a vehicle, a third-party directory service, a vehicle directory service, a mobile client device, an identifying message, a query, a vehicle access invitation, and a synchronization module. The third-party network component is communicatively coupled to a network and has a third-party vehicle cloud service operating thereon. The third-party vehicle cloud service includes a community of end users that can access the third-party vehicle cloud service. The vehicle is associated with a vehicle management module that is communicatively coupled to the network. The third-party directory service is associated with the third-party vehicle cloud service and manages the community of end users that can access the third-party vehicle cloud service. A subset of the community of end users request access to the vehicle. The vehicle directory service is associated with the vehicle cloud service. The mobile client device is associated with one end user of the subset of end users and with a user profile having a plurality of user preferences and at least one user credential indicating the end user has a valid driving license. The mobile client device is communicatively coupled to the network. The identifying message originates from the mobile client device and includes a vehicle access request, the user profile, the user preferences, and the user credential indicating the end user has a valid driving license. The query originates from the vehicle management module and requests vehicle access authorization from the third-party vehicle cloud service when the vehicle access request is received from the mobile client device. The vehicle access invitation originates from the vehicle cloud service and is transmitted to the mobile client device when the identifying message is authenticated by the third-party vehicle cloud service. The vehicle access invitation provides access to the vehicle. The synchronization module synchronizes the third-party directory service and the vehicle directory service according to the vehicle access invitation.

In another embodiment, a method for managing a vehicle cloud service is described. The method includes a series of steps beginning with initialization where the vehicle cloud service is communicatively coupled over a network to a vehicle management module that is associated with a vehicle. Next, a third-party vehicle cloud service determines a community of end users that can access the third-party vehicle cloud service. The third-party vehicle cloud service operates on a third-party network component. The method proceeds when a mobile client device transmits an identifying message to the vehicle management module. The mobile client device is associated with one end user of the community of end users, a user profile having a plurality of user preferences, and at least one user credential indicating the one end user has a valid driving license. The identifying message includes a vehicle access request, the user profile, the user preferences and the user credential indicating the one end user has a valid driving license. The vehicle management module then queries the third-party vehicle cloud service for access authorization to the vehicle, which query includes the identifying message. Next, the third-party vehicle cloud service determines that the user profile corresponds to an end user of the community of end users that can access the third-party vehicle cloud service. The third-party vehicle cloud service then transmits to the vehicle management module an authentication that the one end user associated with the mobile client device can access the third-party vehicle cloud service. The vehicle management module then transmits a vehicle access invitation to the mobile client device. The vehicle access invitation authorizes access to the vehicle. Lastly, a synchronization module synchronizes a directory service associated with the vehicle cloud service according to the vehicle access invitation.

FIGURES

The present invention will be more fully understood by reference to the following drawings which are presented for illustrative, not limiting, purposes.

DESCRIPTION

Figure 1:
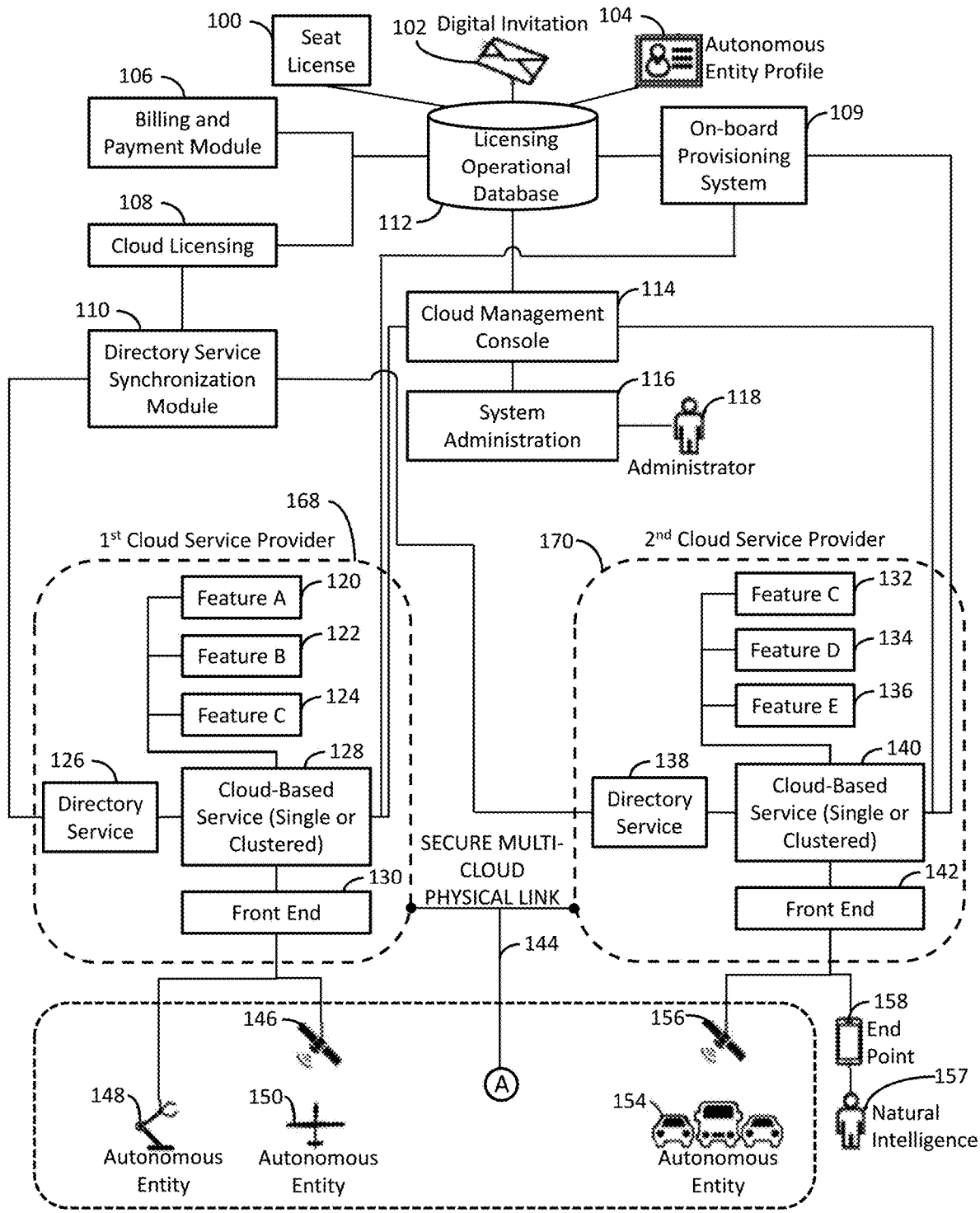
FIG. 1 shows a system for managing a plurality of autonomous licensing entities in a multi-cloud architecture.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and methods described herein may vary as to configuration and as to details. The following detailed description of the illustrative embodiments includes reference to the accompanying drawings, which form a part of this application. The drawings show, by way of illustration, specific embodiments in which the invention may be practiced. It is to be understood that other embodiments may be utilized and structural changes may be made without departing from the scope of the claims.

The systems and method described herein manage an autonomous licensing entity. A per-seat license for cloud-based services is a software or hardware license based on the number of autonomous entities who have access to enterprise software, hardware or cloud service(s). The per-seat license to the cloud service includes the upper limit of autonomous entities that can access the cloud service and an end date for the per-seat license. An autonomous entity profile includes data fields configured to be communicated to at least a first cloud service and a second cloud service. Especially when the autonomous entity is a natural intelligence, the profile data may have intrinsic value for marketing products and services to that natural intelligence or person unrelated to the cloud service corresponding to the per-seat license. Although, profile data corresponding to any autonomous entity may yield valuable information when examined in a bulk format. Thus, profile data corresponding to all autonomous entities, including both natural and artificial intelligences may be brokered for in exchange for one or more per-seat licenses for a cloud service.

A multi-cloud architecture is comprised of a system and method for distributing workloads among different cloud providers including but not limited to Amazon cloud, Google cloud, Microsoft Azure cloud, IBM Cloud, Salesforce Sales Cloud, Oracle Cloud, Alibaba Cloud, VMware Cloud, et al. A hybrid-cloud architecture is comprised of a private network and a single cloud provider. A hybrid-multi-cloud architecture is comprised of a private network utilizing multiple cloud service providers. Specifically, Google Maps platform, geolocation APIs, Google Places API. Azure Media Services, Hot and Cold Blob and queue storage services. Azure App Services to deliver web and mobile data via proprietary Web API. Microsoft web API authentication via OAuth2, Identity Server 4, and 2-factor authentication. Azure Cognitive services to provide vision, image-processing and recognition, Amazon Web Services (AWS) to deliver compute and storage services.

The systems and methods presented herein provide a deterministic approach to resource allocation through per-seat licenses that could mitigate the issues of associated costs, system overloads, and denial of services. Additionally, the systems and methods provide a hierarchy of per-seat licenses for autonomous entities that could enable the ability to provide more granular access to a plurality of cloud features, which may operate through particular hardware.

The system and method presented herein manages cloud computing features for licensing, billing, and data/information for sharing with autonomous entities. The system and method provides time-sensitive access to services that require different workloads. Additionally, the system and method presented herein may be used by cloud service providers in a multi-cloud architecture. The systems and methods presented herein also manage and control licensing and billing.

The systems and methods presented herein may also be used with a self-governing machine such as an autonomous vehicle, which recharges with a smart charging station. A fleet of autonomous vehicles would not require direct human supervision while recharging or refueling, and efficiency would be improved without direct human supervision. Effectively, such a system would be safer as it can be monitored remotely as opposed to traditional methods of direct contact with the source of energy or fuel and without the need for on-site payment. The system and method presented herein can also manage an autonomous licensing entity that charges costs associated with machine-to-machine interactions using a hierarchy of per-seat licenses for non-metered usage of one or more cloud services. A fleet of autonomous vehicles would reduce car ownership while maximizing utilization of shared transportation. Effectively, reducing the problem associated with car ownership including but not limited parking, permits, maintenance, depreciation, etc. Ideally, a system and method for managing per-seat licensing of a fleet of autonomous vehicles maximize the efficiency of a shared pool of resources among autonomous entities. Cloud-based services in particular may be used for management of a fleet of autonomous entities and add-on services for those autonomous entities. In one exemplary embodiment, per-seat licenses for a fleet of electronically accessible rental vehicles are managed by the system and method disclosed herein, so that the per-licenses are transferred among the particular electronically accessible rental vehicles to accommodate intermittent patronage and vehicle turnover.

Access to the autonomous vehicles may be provided electronically through a particular communication architecture for the distribution of unique pass key(s) or one-time passcodes. This particular communication architecture enables hyperlocal authentication by providing full access to an electronically accessible vehicle only when a client user device is within proximity of the electronically accessible vehicle. This communication architecture also provides continuous background cryptographic operations including authentication and encryption between a wireless client device and a gateway network component. In the illustrative vehicle endpoint embodiment, the gateway network component is integrated into, coupled to, or associated with an electronically accessible vehicle, such as an autonomous vehicle.

Endpoint authentication is used to verify and track the identity of external devices connected to a network, thereby ensuring the connectivity of only authorized endpoint devices. Endpoint authentication is important for networks that have remote users. This endpoint authentication system not only verifies users but also monitors incoming connections of endpoint devices. Automotive endpoint authentication has arisen in modern cars that are equipped with connectivity options such as Bluetooth and Wi-Fi, which renders them vulnerable to unauthorized access.

A Network Based Hyperlocal Authentication (NBHA) system and method that is passwordless and provides a continuous background authentication and encryption system for automotive endpoint security is described herein. "Passwordless" is defined as the seamless authentication of devices with a secure, convenient, and efficient proof-of-work from the user. The NBHA system and method provide continuous background authentication and a peer-to-peer encryption system that secures a broadband communication channel to a user's mobile device.

An autonomous entity includes people (natural intelligence), robots, drones, smart appliances, autonomous vehicles, autonomous virtual desktops, artificial intelligence computing or hybrids.

The present systems and methods expand the uses, throughput, distribution, architecture, and applications of managing a per-seat license for a plurality of autonomous entities.

An endpoint may be comprised of a virtual desktop, robots, drones, vehicles, windmills, appliances, software applications, hardware devices, embedded systems, sensors, and IP enabled devices.

A fleet of autonomous entities is comprised of a plurality of autonomous entities communicatively coupled to artificial intelligence or machine intelligence for machine-to-machine self-governing operations.

An autonomous entity may be capable of signing, requesting, and using a cloud service through an integrated endpoint. Additionally, endpoint(s) may be broadly defined as delivery mechanisms of a cloud service to the autonomous entity when using a valid per-seat license. Furthermore, each per-seat license level is correlated to a hierarchy of features corresponding to the cloud service to which the per-seat license grants use rights or access.

The systems and methods enable machine-cloud-machine interactions, human-cloud-human interactions, and human-cloud-machine interactions using per-seat licensing for cloud services subdivided into a plurality of features. In one embodiment, the autonomous system and method are capable of using, distributing, or managing a per-seat license to proprietary software for self-governed interactions between artificial intelligence and an autonomous vehicle for updates, energy management, payments, analytics, entertainment, access control, and predictive maintenance.

The NBHA system and method are capable of satisfying two core requirements, namely, protecting user privacy and protecting physical asset access. The NBHA system satisfies these core requirements with a hardware architecture that includes three hardware elements: a network component (e.g., server), a gateway, and a mobile application that is executed on a mobile device. The NBHA system and method authenticates (verifies) and secures or encrypts communications using a Secure Geofence (SG) protocol. The combination of the NBHA system and SG protocol produce a seamless authentication process, which dynamically and automatically establishes a strong password in the background operations of the user's device, while protecting users' privacy. Seamless authentication is a method where the user is authenticated towards an entity without the burden of a credential request. Also, the NBHA system and SG Protocol operate as a background process, so the user does not have direct control of the NBHA system.

Once the NBHA system and SG protocol are operational, they can continue to operate in the background so that users can interact securely with a mobile application or a desktop application. Critically, when the NBHA system or SG protocol are not operational (e.g., when a user leaves a SG location), users' access to the mobile application or desktop application is restricted. The application-centric security of the NBHA system and SG protocol allows this solution to be easily integrated with existing applications. Again, the NBHA system and SG protocol support continuous passwordless authentication and cryptographic operations that are occurring as a background process.

The NBHA system and method in combination with the SG protocol protects user privacy by relying substantially on location based authentication instead of the typical user registration process that requires a username and a password. Simply put, if the user is not in proximity to the gateway, the user cannot be tracked. If the user is within proximity to the gateway and initiates communications with the NBHA system using the SG protocol, the client device is authenticated seamlessly (i.e., without the need for a user to register a username and password). Depending on the mobile application, the user can be known, anonymous, or pseudo-anonymous. Known users have an established relationship to the mobile device used within a SG. For example, known users may have completed a registration process to register themselves or their mobile device. In contrast, anonymous users have performed no registration and their mobile device is not associated with any registered user. Anonymous users are users of unknown devices identified merely by mobile advertising packets broadcast over a short range wireless channel, such as Bluetooth. The pseudo-anonymous state relates to an unknown user and mobile device that are physically located in a privileged access control location; for example, a user may be required to show a security identification to enter a secure area and once in the secure area. In the pseudo-anonymous state, the user can maintain some degree of anonymity, i.e. they are one of the privileged individuals that have entered an access controlled area and hence, they are "pseudo-anonymous."

The NBHA system and method in combination with the SG protocol relies on symmetric keys and blockchain ledgers to establish fast and secure peer-to-peer communications without requiring the user to remember strong passwords.

In automotive endpoint authentication embodiments, the gateway is associated with an automobile, the wireless mobile application operating on the wireless device is associated with the user, and the automotive entity authenticates both communications channels. The NBHA system and method using the SG protocol verifies and tracks the identity of external devices connected to a network, thereby ensuring the connectivity of only authorized endpoint devices. The gateway includes a scanner that constantly scans communications and wireless communications channels for devices trying to access the vehicle/automobile. These devices may be registered, unregistered, registered anonymously, or any combination thereof. Registered devices are known to the NBHA system, i.e. in association with a particular user, and/or through a standard registration process. Unregistered devices are not known to the NBHA system and have not broadcast any unique identifiers (e.g., mobile advertising packets) in proximity of any gateway. Anonymously registered devices are unknown devices that have broadcast a unique identifier within proximity of a gateway, and subsequently been logged according to the unique identifier broadcast. Thus, certain devices trying to access the vehicle may be unregistered and considered a rogue device and/or user.

The automobile gateway may be embodied as a stand-alone device or a component of another broader system (e.g., the hardware and/or operating system of the automobile). A gateway component may include a plug-in hardware (e.g., a USB dongle), a wireless device, or software operating on hardware integrated into the vehicle's operating systems. A stand-alone gateway may be for example, a smartphone or tablet that a user brings to the vehicle to establish proximity authentication.

In various embodiments, one or more Certificate Authorities ("CAs") are associated with the automobile and its features. For example, one CA may authorize the use of the vehicle in its entirety. In another embodiment, each vehicle feature (e.g., airbags, remote start, XM radio service, etc.) may be associated with and/or authorized by a distinct CA.

For the purposes of this disclosure, Mobility-as-a-Service (MaaS) is the usage of a service that is provided by a cloud service provider through a plurality of secure cloud enclaves equipped with a plurality of distinct features.

In all embodiments, the SG protocol includes a SG challenge that is presented to a remote network component seeking a valid answer in order to authenticate a client device. The SG challenge includes a plurality of cryptographic material such as one-time passwords, one-time passcodes, one-time PINs, initialization vectors, counters, public keys, hashes, or a combination thereof, all of which may generally be termed "key material". First, a wireless device in a geofence receives the challenge from a gateway, or a component thereof, as proof-of-work. Next, the SG challenge is submitted to the remote network component for registration or/and authentication.

The SG protocol operates across a dual channel as opposed to VPN technologies that use a single broadband channel. More specifically, the SG protocol includes one or more broadband channels and a short-range wireless channel supported by the gateway that can perform as an out-of-band channel. The SG protocol solution provides out-of-band data transfers over an independent channel or short-range wireless channel from the main in-band data stream, i.e., the broadband channel.

A Virtual Private Network (VPN) encapsulates network data for confidentiality, integrity, and availability. VPNs employ cryptographic algorithms and tunneling protocols to achieve privacy and security. The plurality of existing VPN protocols includes Internet Protocol Security (IPsec), Wire Guard, Transport Layer Security (SSL/TLS), Secure Shell (SSH) VPN, Microsoft Point-to-Point Encryption (MPPE), Datagram Transport Layer Security (DTLS), closed source VPNs, and open-source projects. VPN authentication includes passwords, biometrics, two-factor authentication, and a combination thereof. Similarly, the SG protocol encapsulates data at the application layer for confidentiality, integrity, and availability. In addition, the SG protocol operates in a dual-channel approach that utilizes an out-of-band channel to authenticate users based upon proximity to a gateway and/or a specific location.

Commercial VPN services provide security capabilities for a monthly fee to enhance an endpoint's privacy and security through encrypted channels and proxies. In contrast to the geographically limited proximity authentication of the SG protocol, VPN services are commonly used to remove geographic restrictions imposed by an Internet Service Provider (ISP). The data transmitted in plaintext is revealed after leaving the proxy service and visible to a malicious actor. A secure VPN connection is established when the endpoints control the entire data path's encryption process, or the content is encrypted before sending the data over the Commercial VPN service. By comparison, the SG protocol offers peer-to-peer encryption at the application, presentation, and session layer of the Open Systems Interconnection (OSI) model.

VPN technology is a data-agnostic approach to connect sites and clients securely. Meanwhile, the SG protocol is data-aware. The SG protocol can perform decisions depending on the data type (e.g., structured data vs. unstructured data, private information vs. public data). Furthermore, the SG protocol includes a broadcast channel to reach all clients in a plurality of geofences. In various embodiments, this broadcast channel may be a broadband communications channel.

VPN capabilities and SG capabilities complement each other for an effective in depth defense strategy to secure a larger network path. The SG protocol is data type aware, using an out-of-band channel to deliver a plurality of cryptographic key material (e.g., hashes, tokens, initialization vectors, counters, one-time passwords, one-time passcodes, one-time PINs, public keys, or a combination thereof). Lastly, the SG protocol offers peer-to-peer encryption and keyed hashing functions for confidentiality, integrity, and availability as described in further detail below.

An illustrative system drawing is presented in FIG. 1, which supports autonomous entities and endpoint extensions. The architecture diagram of FIG. 1 describes a system comprising elements such as a per-seat license 100, a digital invitation 102, and an autonomous entity profile 104 stored in a Licensing operational database 112 or equivalent storage. The system includes a cloud billing module 164, a cloud licensing module 108, and an on-board provisioning system 109 communicatively coupled to the Licensing operational database 112. A Directory Service Synchronization Module 110 is in charge of synchronizing directory services among a plurality of cloud services 168 and 170, where each directory service may be associated with a particular cloud service of the plurality of cloud services. A Cloud Management Console 114 is communicatively coupled to a System Administration system 116 used by administrators 118 of the multiple cloud services 168, 170. Each of the cloud services 168, 170 include a plurality of features 120, 122, 124, 132, 134, 136, a directory service 126, 138, a Front End 130, 142, and a Cloud-Based Service (Single or Clustered) 128, 140. A secure multi-cloud physical link is shown 144 between the cloud services 168 and 170. In various embodiments, the cloud services operate as Certificate Authorities ("CAs") associated with an end point device or hardware, such as an automobile and its features.

The secure multi-cloud physical link 144 comprises a physical connection between cloud service providers that is secure, low latency, high availability, high throughput, and high reliability.

Endpoints and autonomous entities are illustrated with a line indicating a relationship that can take many shapes and forms, which can include a communicative coupling (i.e., being in wireless or wired communication), a physical link (i.e., physical contact), control or ownership thereof (i.e. a person owning or operating a smartphone or tablet), or other such relationship.

The on-board provisioning system 109 includes a self-provisioning system, access control of the multi-cloud architecture, an on-boarding engine, and a management module used to control access to or from a plurality of cloud services. The management module may be unique to services provisioned, i.e. a vehicle management module where vehicle services are provisioned. The self-provisioning system allows autonomous entities to register and launch a plurality of cloud features without direct interventions from a Multi-Cloud Administrator (MCA). Access control of the multi-cloud architecture is achieved through authentication of device information unique to each autonomous entity, i.e. unique device ID or MAC address. The on-boarding engine enters or enrolls autonomous entities in a database of autonomous entities entitled to use or access one or more of the cloud services 168 and 170 associated with the per-seat licenses 100 distributed and managed by the system.

In one embodiment, the system and method refer to bringing premises-based enterprise services to a public cloud or private cloud deployment. The cloud licensing module 108 may be configured to identify a maximum number of autonomous entities that can access each cloud service and an end date for accessing either each cloud service, one or more feature of each cloud service, or any combination thereof. The cloud licensing module 108 can be located on a remote server, a cloud server, or be included in one or more cloud service. The maximum number of autonomous entities that can access each cloud service is an upper limit of per-seat licenses that may be active at the same time or during the same period of time. The cloud licensing module determines the upper limit for a particular cloud service and determines whether the number of active licenses is greater than, equal to, or less than the upper limit. When the number of active licenses is greater than or equal to the upper limit, the cloud licensing module denies any request for a per-seat license or does not issue a digital invitation for the particular cloud service, which digital invitation unlocks or provides access to the particular cloud service and/or features thereof. Additionally, when the number of active licenses is greater than the upper limit for the cloud service, the cloud licensing module can revoke one or more active licenses to reduce the number of active licenses to a number equal to the upper limit. When the number of active licenses is less than the upper limit, the cloud licensing module approves license requests or issues digital invitations. In some embodiments, the cloud licensing module may store a global autonomous entity profile 104 associated with a predetermined set of profile features, such as financial commitments, budgets, and pre-approvals for autonomous entities to accept licenses. In one embodiment, the global autonomous entity profile 104 is a user profile including a plurality of user preferences and at least one user credential. In some embodiments, the user credential indicates that a user associated with the user profile and/or a mobile device has a valid license pertinent to the services offered by the cloud service, e.g. a valid driving license.

The Directory Service Synchronization module 110 enables the Licensing Operational Database 112 to synchronize with each of the directory services 126 and 138 according to each autonomous entity's accepted digital invitations 102. The Directory Service Synchronization module 110 can be located on a remote server, a cloud server, or be included in one or more cloud service. Furthermore, the Directory Service Synchronization module 110 enables each directory service 126, 138 to synchronize with the Licensing Operational Database 112. Thus, in one embodiment, digital invitations 102 including license activation information or otherwise providing authentication for the receiving autonomous entity to utilize a per-seat license for a particular cloud service that have been issued by the Licensing Operational Database 112 to an autonomous entity are tracked by the Licensing Operational Database 112 upon issuance, but are not tracked by the Directory Service Synchronization module 110 until the autonomous entity redeems the digital invitation 102 or attempts to access the associated cloud service. When the autonomous entity does redeem or attempt to access the associated cloud service, the directory service for the cloud service authenticates the information in the digital invitation and logs identifying information for the autonomous entity. This logged information is communicated from the directory service to the Directory Service Synchronization module 110, which synchronizes the records of the Licensing Operational Database 112 to reflect that the issued digital invitation has been utilized by the autonomous entity. Further, the date, time, and duration (where appropriate) of the cloud service access by the autonomous entity is recorded.

The illustrative cloud services may be embodied as one of four fundamental cloud service models, namely, infrastructure as a service (IaaS), platform as a service (PaaS), software as a service (SaaS), and network as a service (NaaS).

A broadband network supporting wireless communications channels illustrated as 146, 156 may comprise 4G and 5G support or other available wireless networks. An autonomous entity can communicate using a broadband network with low latency, high availability, high reliability, and high mobility.

An autonomous entity is comprised of people (natural intelligence) 157, robots 148, drones 150, and autonomous vehicles 154. The autonomous entities 148, 150, and 157 may include a gateway communicatively coupling the autonomous entity to end points, cloud services, the directory service synchronization module, and/or the on-board provisioning system. The gateway can include a plug-in hardware (e.g., a USB dongle), a wireless device, or software operating on hardware integrated into the vehicle's operating systems. A stand-alone gateway may be for example, a smartphone or tablet that a user brings to the vehicle to establish proximity authentication. An endpoint 158 may be comprised of a smartphone, a tablet, a laptop, a desktop computer, a Wi-Fi enabled vehicle, or other computing device for individual use. In addition, an endpoint may be integrated into an autonomous entity, such as robots 148, drones 150, and autonomous vehicles 154. In embodiments where the endpoint is a mobile device, the end point may be termed a "mobile client device" and be capable of executing one or more client device applications. Further, the mobile client device is configured to communicate with a gateway using a short-range communication channel, such as Bluetooth or Wi-Fi.

In another embodiment, the system and method are hosted in a plurality of cloud service providers such as Amazon cloud, Microsoft Azure cloud, Google cloud, IBM Cloud, Salesforce Sales Cloud, Oracle Cloud, Alibaba Cloud, or VMware Cloud, et al.

Figure 2:
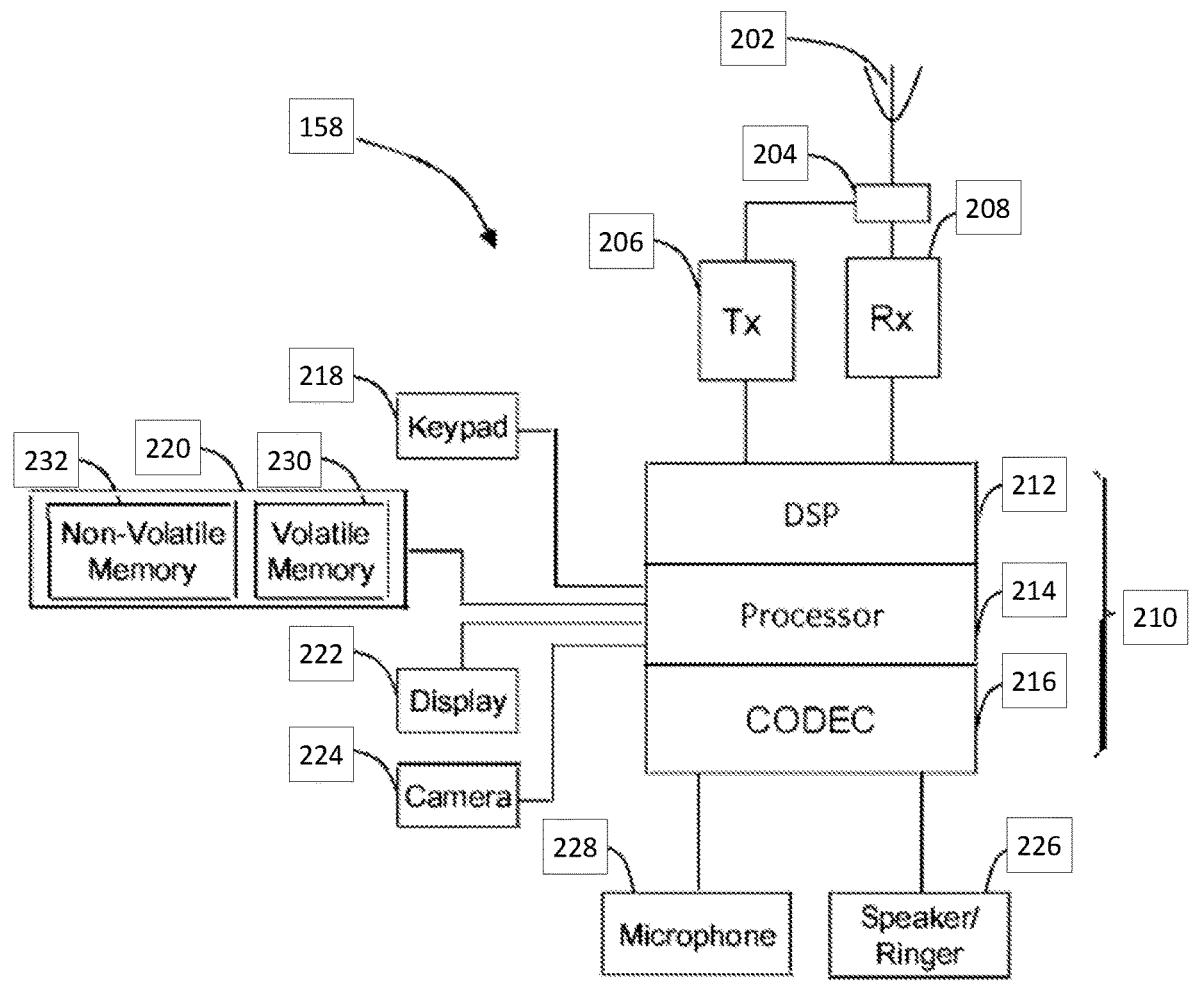
FIG. 2 shows an illustrative client device.

Referring to FIG. 2 there is shown the electrical components for an illustrative wireless endpoint 158, also termed a client device or client mobile device. The illustrative endpoint 158 is a multimode wireless device that comprises a first antenna element 202 that is operatively coupled to a duplexer 204, which is operatively coupled to a multimode transmitter module 206, and a multimode receiver module 208.

An illustrative control module 210 comprises a digital signal processor (DSP) 212, a processor 214, and a CODEC 216 that are communicatively coupled to the transmitter 206 and receiver 208. It shall be appreciated by those of ordinary skill in the art that the transmitter module and receiver module are typically paired and may be embodied as a transceiver. The illustrative transmitter 206, receiver 208, or transceiver is communicatively coupled to antenna element 202.

The DSP 212 may be configured to perform a variety of operations such as controlling the antenna 202, the multimode transmitter module 206, and the multimode receiver module 208. The processor 214 is operatively coupled to a keypad 218, a memory 220, a display 222, and camera 224. Additionally, the processor 214 is also operatively coupled to the CODEC module 216 that performs the encoding and decoding operations and is communicative coupled to a speaker or ringer 226, and a microphone 228. The CODEC module 216 is also communicatively coupled to the display 222 and provides the encoding and decoding operations for video.

The memory 220 includes two different types of memory, namely, volatile memory 230 and non-volatile memory 232. The volatile memory 230 is computer memory that requires power to maintain the stored information such as random access memory (RAM). By way of example and not of limitation, images presented in preview mode would use the storage resources corresponding to the volatile memory 230. The non-volatile memory 232 can retain stored information even when the endpoint (e.g., wireless communication device) 158 is not powered up. Some illustrative examples of non-volatile memory 232 include flash memory, ROM memory, and hard drive memory. In the illustrative embodiment, the captured image is processed using a volatile memory 230 and stored in the non-volatile memory 232.

In various embodiments, endpoint 158 may be a mobile handset, mobile phone, wireless phone, portable cell phone, cellular phone, portable phone, a personal digital assistant (PDA), a tablet, a portable media device, or any type of mobile terminal which is regularly carried by an end user and has all the elements necessary for operation in a wireless communication system, additionally the endpoint 158 may be a stationary home computer, a stationary computing device, or an electronically accessible vehicle that is Wi-Fi enabled. The wireless communications include, by way of example and not of limitation, CDMA, WCDMA, GSM or UMTS or any other wireless communication system such as wireless local area network (WLAN), Wi-Fi or WiMAX. The endpoint 158 comprises a device content interface. The device content interface is a graphical user interface that displays content on a display of the endpoint 158. The device content interface may also be configured to receive end user input, such as feedback pertaining to the displayed content and user-created content. The device content interface may be an application running on a processor of the endpoint 158. In other embodiments, the device content interface is accessed via network, for example, using an internet browser application or a cloud service specific application running on a processor of the endpoint 158.

Figure 3:
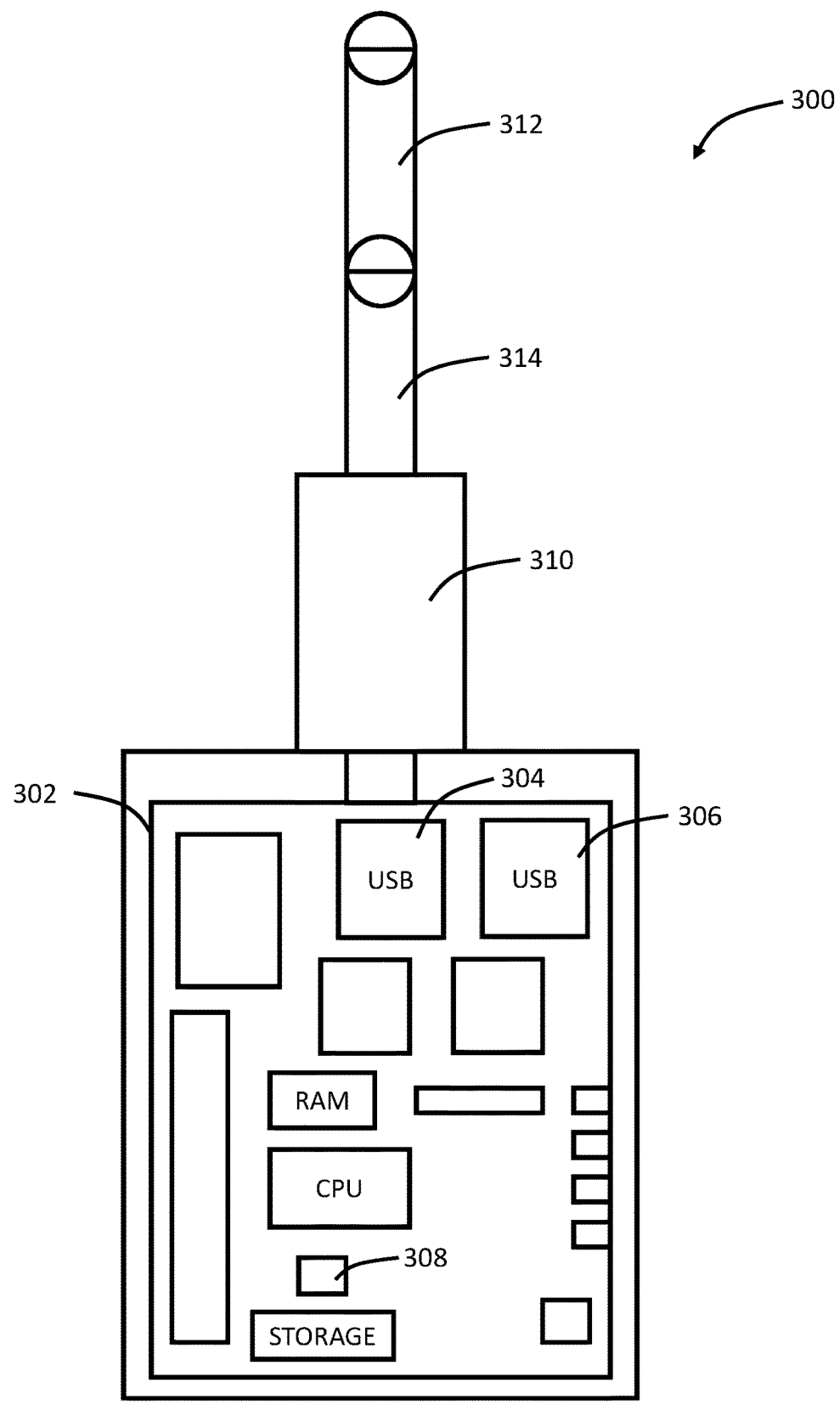
FIG. 3 shows an illustrative gateway construction with an omnidirectional antenna.

Referring now to FIG. 3, there is shown an illustrative gateway 300 with a plurality of sensors and an omnidirectional antenna design optimized for cellular and/or Wi-Fi frequency band applications, such as the 700 MHz band, 800 MHz band, 850 MHz band, 1700 MHz band, 1900 MHz band, 2100 MHz band, 2.4 GHz band, and 5 GHz band. The illustrate gateway includes a computer board 302 having a CPU, RAM, and storage for code execution. Additionally, the Illustrative gateway includes a first USB dongle 304, a second USB dongle 306, an internal Bluetooth 5.0 module 308, a programmable RF module 310, and a maneuverable omnidirectional antenna formed from antenna components 312 and 314 coupled by an elbow joint and/or swivel joint to one another and the gateway 300. The maneuverable omnidirectional antenna is designed and optimized for cellular and/or Wi-Fi frequency band applications, such as the 700 MHz band, 800 MHz band, 850 MHz band, 1700 MHz band, 1900 MHz band, 2100 MHz band, 2.4 GHz band, and 5 GHz band. Further, the computer board 302 itself includes a CPU, RAM, and storage for code execution. In an illustrative embodiment, the elbow joint is rotatable through a 90-degree tilt and the swivel joint is rotatable through 360-degrees. In an alternate embodiment, the antenna is a directional antenna, which narrows the area of effect of the short-range communication channel.

In some embodiments, the gateway 300 can further include graphics, general purpose I/O for sensors, wireless broadband technologies (e.g., Wi-Fi), mobile broadband technologies (e.g., 3G, 4G, LTE), wired broadband technologies (e.g., Ethernet, coaxial cable, and fiber), and a plurality of low energy short-range wireless radios (e.g., BLE, Zigbee, NFC, RFID). The gateway 300 is capable of supporting a plurality of wireless protocols, e.g., 802.11 b/g/n, 802.11 a/n/ac and 802.11 ad, in the 2.4, 5.0, and 60 GHz wireless ranges. The low energy short-range wireless radio(s) include an area of effect (AoE) or effective broadcast range within which short-range signals can be received by other wireless devices, such as wireless mobile client devices, and outside of which AoE or broadcast range signals emitted from the gateway 300 cannot be received.

In some embodiments, the gateway 300 is a stand-alone transceiver that may be mobile or fixed in a particular location. In other embodiments, the gateway 300 is integrated into an autonomous entity or other service-related hardware, i.e. an electronically accessible vehicle, as physical components or software operating on the autonomous entity or other service-related hardware. In still a further embodiment, the gateway 300 is plug-in hardware that integrates with vehicle operating system, such as a USB dongle or similar hardware that is externally attached to an autonomous entity or other service-related hardware. In yet another embodiment, the gateway 300 is a combination of the USB dongle or similar hardware and the autonomous entity or other service-related hardware in which it is inserted. Thus, the gateway can include an edge-based network device, a network node, an access point, a base station, a networked beacon, a femtocell, or any combination thereof.

In mobile gateway embodiments, the gateway may be integrated into a vehicle or after-market feature plugged in to the vehicle, smart watch, or an electronic identification band, and therefore define its location as the present space occupied by and immediately surrounding a user or a particular vehicle.

Figure 4:
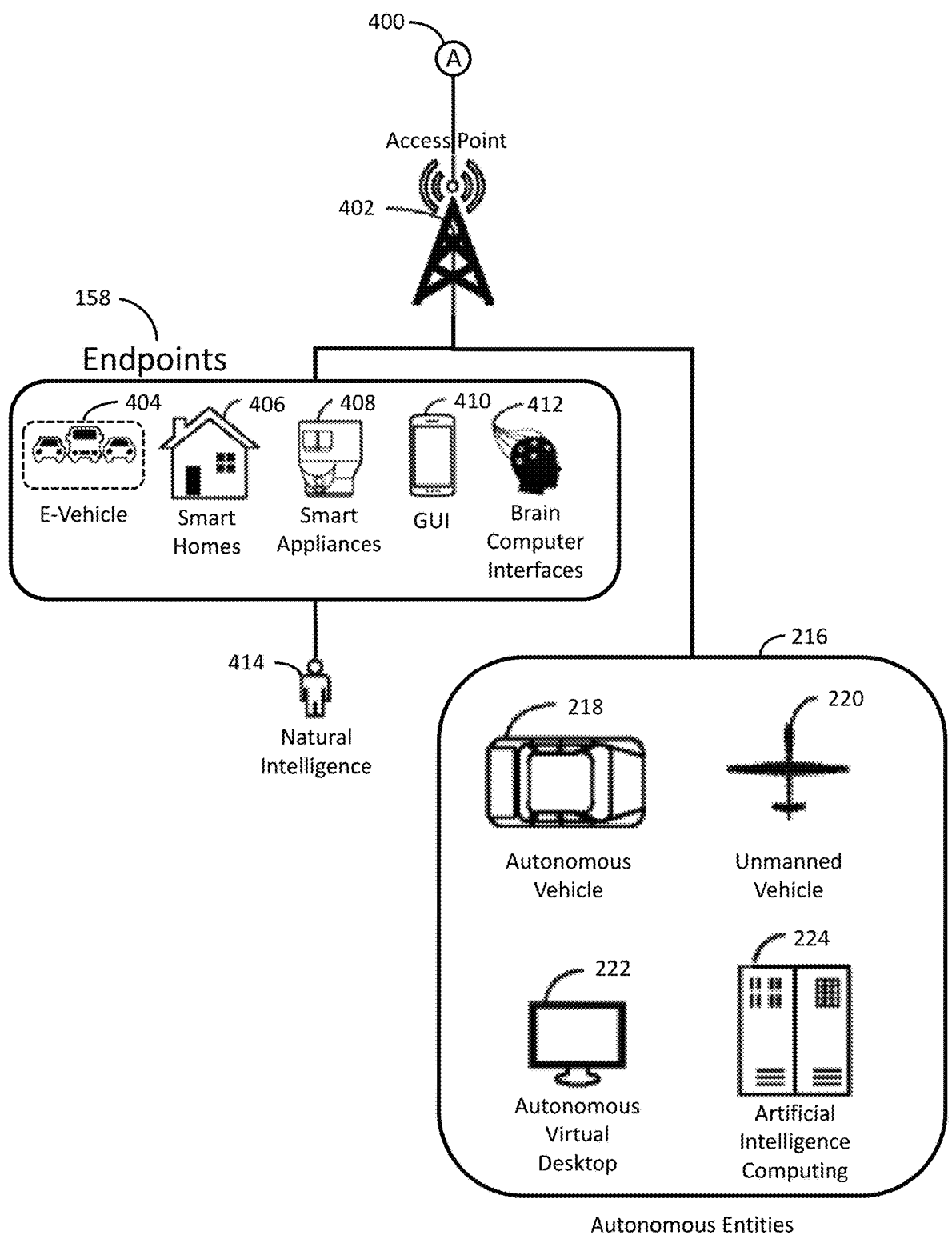
FIG. 4 shows relationships between a plurality of autonomous entities including machine-to-machine interactions.

With reference to FIG. 4, there is shown an embodiment 400 including a fixed Access Point 402 communicatively coupled to endpoints 158 and autonomous entities 416. The Endpoints 158 may include electronically accessible vehicles (E-Vehicles) 404, smart homes 406, smart appliances 408, graphical user interface (GUI) 410, and brain-computer interfaces 412, with which a natural intelligence (person) 414 interacts by receiving output from an endpoint 158 and providing input to the endpoint 158. The output from the endpoint can include user prompts, endpoint telemetry, optional or additional endpoint features, etc. The input provided by a natural intelligence through a mobile client device can include user selections corresponding to the user prompts and endpoint features, as well as operational control input corresponding to the endpoint telemetry.

A group of autonomous entities 416 may include at least one autonomous entity capable of self-governing and self-administration. The group of autonomous entities 416 may also include a plurality of autonomous vehicles 418, an unmanned drone 420, an autonomous virtual desktop 422, and artificial intelligence (AI) computing 424. In addition, the group of autonomous entities 216 can be embodied as, and referred to as, a fleet of autonomous vehicles. In an exemplary embodiment, a rental company may operate the fleet of autonomous vehicles and distribute through the access point 402 a number of per-seat licenses to certain of the autonomous vehicles in the fleet that request or need a per-seat license for a certain cloud service.

Figure 5:
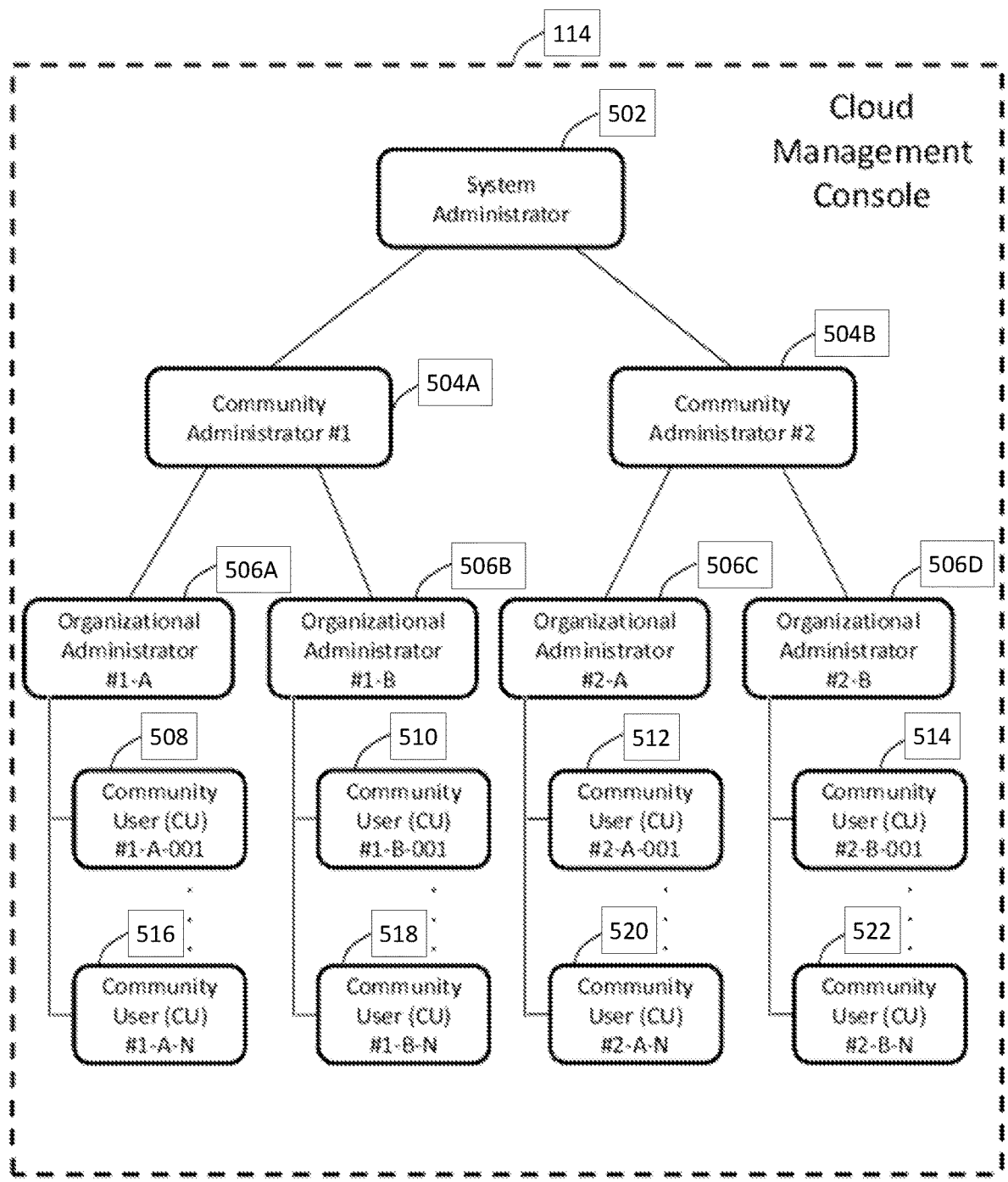
FIG. 5 shows an embodiment of human-cloud-human and human-cloud-machine interaction using a system and method for managing an autonomous licensing entity with a per-seat license in a multi-cloud architecture.

Referring to FIG. 5 there is shown the cloud management console 114 having a hierarchical network Administrator framework for controlling per seat licenses for cloud services. The cloud management console can operate on a remote server, a cloud server, or be included in one or more cloud service. The hierarchical network Administrator framework can also be used to control access to a cloud service on a premise-based server.

The illustrative cloud management console 114 has a hierarchical network Administrator framework that includes a first-tier Administrator that is referred to as a System Administrator (SA) 502, a second-tier Administrator referred to as a Community Administrator (CA) 504A-B, a third-tier Administrator referred to as an Organization Administrator (OA) 506A-D, and a plurality of end users (i.e., endpoint or autonomous entity), in this illustrative example referred to as Community Users (CUs) 508-522.

Generally, the first-tier Administrator 502 identifies a community and an upper limit of end users that can belong to the community. The second-tier Administrator 504 is selected by the first-tier Administrator 502 and creates at least one Organizational Unit that is a subset of the end users within the community. The third-tier Administrator 506 is selected by the second-tier Administrator 504 and can add end users to the Organizational Unit. Each end user is presented with a user interface (UI) that includes all the Organizational Units. By way of example and not of limitation, each Organizational Unit corresponds to a particular cloud service.

In some embodiments, the cloud management console 114 can be part of the on-board provisioning system 109. In other embodiments, the cloud management console 114 may be embodied as a standalone module that includes the directory service synchronization module, as a relational database having the appropriate schema, as an independent cloud licensing module, or as a combination thereof.

In general, the operations performed by the cloud management console 114 are related to supporting a hierarchical network Administrator framework that controls access to one or more cloud services in a manner consistent with the per-seat licensing requirements for each cloud service.

More particularly, the cloud management console 114 enables a System Administrator (SA) 502 to create new communities, edit communities, and delete communities. The SA 502 has a relatively broad set of rights and privileges. In the illustrative embodiment, the SA 502 can assign a more limited set of rights (than the SA rights) to the Community Administrator (CA) 504A and 504B. The SA 502 can also create at least one Organizational Unit that is a subset of end users within the community.

In the illustrative embodiment, the hierarchical network Administrator framework is operatively coupled to the Licensing Operational Database 112 (shown in FIG. 1) that the first-tier Administrator (System Administrator) 502 can control by identifying the community and the upper limit of end users that can belong to the community. Simply put, the first-tier Administrator (SA) 502 provides the second-tier Administrator (CA) 504 and third tier Administrator (OA) 506 with limited access to the database 112.

The illustrative embodiment also includes a digital invitation communicated from one of the Administrators to an end user, in which the digital invitation enables the end user to access the cloud service when the end user accepts the invitation. Depending on the assigned privileges or rights, either the SA 502 or CA 504 can remove end users from the community when the end user does not accept an invitation communicated from one of the Administrators. Additionally, at least one group that is a subset of the Organizational Unit and either the SA 502 or CA 504 is capable of adding end users to the group depending on the assigned privileges or rights.

The system may also include a per seat license to the cloud service, wherein the license includes the upper limit of end users that can access the cloud service. In the illustrative embodiment, licensing is managed by a cloud licensing module 108 (see FIG. 1), which also includes an end date for the per-seat license.

The hierarchical network Administrator framework system may also support a group that is a subset of the Organizational Unit so that the third-tier Administrator 506 may add or remove end users from the group. The third-tier Administrator (OA) 506 may also remove users from the community when the end users do not accept an invitation communicated from the Administrator to the end user, in which the invitation enables the end user to access the cloud service. In the illustrative embodiment, the second-tier Administrator 504 can also add or remove end users from the Organizational Unit.

In the illustrative embodiment, the SA 502 has assigned Community Administrator #1 504A and Community Administrator #2 504B with the rights to administrate an Organizational Unit (OU). Additionally, the Community Administrator (CA) 504 can impose maximum end user limits and service expiration dates for the Organizational Unit. The CA 504 can also create Groups within an organization, e.g. a "sales" group and a "support" group. The Community Administrator 504 may also assign end users to the Organizational Unit and Group. The Community Administrator 504 can also add new end users to the community.

The Community Administrator 504 may also assign an even more limited set of rights (than the CA rights) to an Organizational Administrator (OA) 506. The Organization Administrator (OA) 506 is assigned to administrate their organization. The Organizational Administrator 506 may also add end users to the Organizational Unit or remove end users from the Organization Unit. The Organization Administrator 506 can also add, delete and remove end users from a Member Distribution Group. Additionally, the OA 506 can also reset passwords and create new passwords. Thus, the CA 504 may assign the right to administrate an Organizational Unit to the Organizational Administrator.

In an illustrative example, the Community Administrator 504A assigns rights to Organizational Administrator 506A and 506B, and CA 504B assigns rights to OA 506C and OA 506D. Each Organizational Administrator 506 has management and control over their respective Organization Unit, which includes at least one Community User (CU) 508-522. For example, OA 506A has management and control over community users 508 and 516; OA 506B has management and control over CU 510 and 518; OA 506C has management and control over CU 512 and 520; and OA 506D has management and control over 514 and 522.

The Community User (CU) is the end user that may have access to the cloud service. In one embodiment, the Community User is presented with a User Interface (UI) that includes the Communities that are available to the particular user. By way of example, the UI may be a cloud management console that is also available to System Administrators, but without the CU having Administrator privileges. Additionally, the CU can view the Community setting and configuration information. Once the CU has accepted the invitation, the CU can download software that is available to the user's community.

Generally, the Community User can view, add, edit, and delete personal meeting rooms. Additionally, the Community User can view, add, and edit personal profile information and change his/her password. Thus, when a user authenticates to the Cloud Management Console (CMC), the user is able to see all of the managed Communities that they belong to. Additionally, the user can see the configuration parameters to configure their Unified Communications Client to authenticate to each server. Furthermore, the user can see all configuration information necessary to utilize the features of that community, such as Broadsoft Plugin installation and settings, Polycom video conferencing plug ins and settings, Desktop SIP phones and more.

Figure 6:
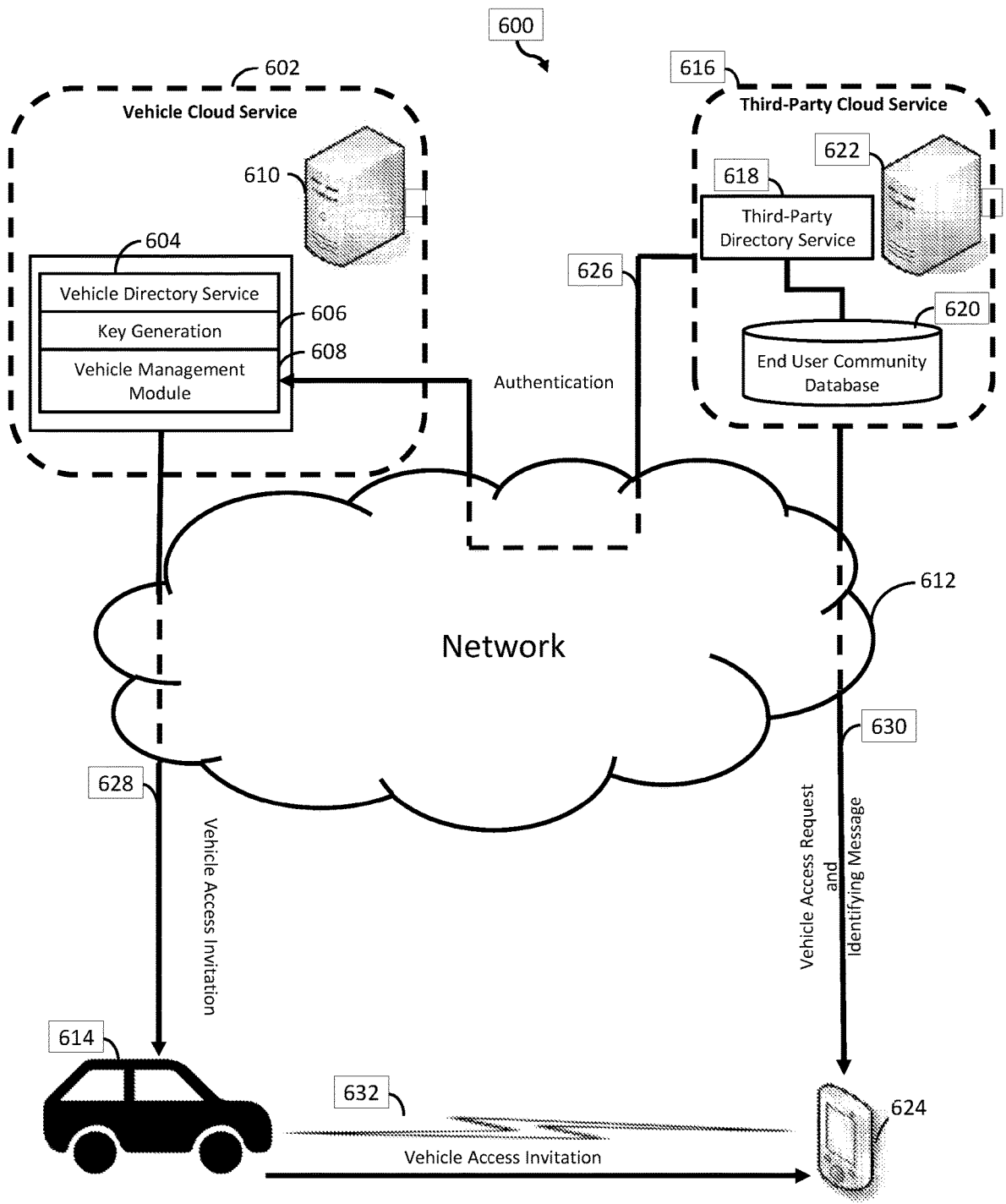
FIG. 6 shows a dual channel authentication system architecture supporting a vehicle access application.

Referring now to FIG. 6, there is shown an illustrative multi-channel system 600 that provides automotive endpoint authentication for cloud services according to a per-seat license. In this embodiment, the gateway is associated with an automobile, the wireless mobile application operates on the wireless device associated with the end user, and a cloud service authenticates both communication channels. The multi-channel system (also termed the "NBHA system") and method using the secure geofence ("SG") protocol verifies and tracks the identity of external devices connected to a network, thereby ensuring the connectivity of only authorized endpoint devices.

The multi-channel system 600 for securely communicating with a networked client device and a wireless device to manage one or more cloud services includes a vehicle cloud service 602, a vehicle directory service 604, a key generation module 606, and a vehicle management module 608 that operate on a network cloud component 610, such as a server. The network cloud component 610, as well as the components operating thereon, are communicatively coupled to a network 612, and through that network 612 to the other components of the multi-channel system 600, such as a plurality of vehicles 614 and a plurality of third-party cloud services 616.

The vehicle cloud service 602 can include a vehicle manufacturer cloud service having control and/or access rights to a vehicle 614, or a plurality of vehicles, i.e. a fleet of vehicles. The vehicle directory service 604 associated with the vehicle cloud service 602 is an information infrastructure for locating, managing, administering, and organizing the network resources of the vehicle cloud service 602. The network resources can include vehicles 614, vehicle identification information, vehicle access rights, and other vehicle information.

The key generation module 606 generates access keys unique to each vehicle 614 in the plurality of vehicles. The access keys can include cryptographic material, an initialization vector, a seed key, one or more hash, an asymmetric key, a private key, a public key, or any combination thereof. In some embodiments, the key generation module 606 may further combine the access key with a unique identifier associated with a particular end user to generate a digital access invitation unique to one vehicle of the plurality of vehicles and the particular end user.

In the illustrative embodiment, the vehicle management module 608 operates on the network cloud component 610 and interfaces with one or more of the plurality of vehicles 614 to which the vehicle cloud service 602 has control and/or access rights. In some embodiments, the vehicle management module 608 receives one or more keys from the key generation module 606 and combines one or more of the keys with unique identifying information associated with a particular end user to generate a digital access invitation unique to one vehicle of the plurality of vehicles and the particular end user. In various embodiments, the vehicle management module 608 has control and/or access rights to the plurality of vehicles.

In the illustrative embodiment, the network component 610 hosts each of the vehicle cloud service 602, the vehicle directory service 604, the key generation module 606, and the vehicle management module 608. In other embodiments, one or more of the vehicle cloud service 602, the vehicle directory service 604, the key generation module 606, and the vehicle management module 608 operate on independent servers or computing devices. In various embodiments, the vehicle management module 608 may reside on the network cloud component 610, one or more of the plurality of vehicles 614, an independent server, or a server hosting one or more third-party cloud service 616.

The third-party cloud services 616 each include an associated third-party directory service 618 and database 620. In the illustrative embodiment, the third-party cloud service 616, third-party directory service 618, and database 620 are hosted on a third-party network component 622, such as a dedicated server or a cloud. In other embodiments, the third-party cloud service 616, third-party directory service 618, and database 620 are hosted on separate servers or located in distinct cloud locations.

The third-party cloud service(s) 616 can include rental services, taxi services, and aftermarket add-on services. In the illustrative embodiment, the third-party cloud service 616 is a car rental company that authenticates end users as authorized to have access to one or more vehicle 614. Each third-party cloud service 616 can operate as a Certificate Authority ("CA") authorizing the use of one or more features unique to that third-party cloud service. In one embodiment, the third-party cloud service 616 authorizes use of the vehicle 614 in its entirety. In another embodiment, each vehicle feature (e.g., airbags, remote start, XM radio service, etc.) may be associated with and/or authorized by a different and distinct third-party cloud service CA. Thus, one or more of the features may include a locked state and an unlocked state, such that the features are lockable and unlockable. In the locked state, a feature may not be available to an end user, i.e. the end user may not have access to the locked feature. In the unlocked state, a feature may be available to the end user, i.e. the end user may be granted access to the unlocked feature.

The database 620 can include identifying information for a community of end users authorized to access the one or more vehicles 614. The identifying information can include a user profile, at least one user credential indicating the end user has a valid driving license, and a plurality of user preferences, such as vehicle settings, mirror settings, seat settings, and engine settings.

Each vehicle 614 of the plurality of vehicles may be simply any type of vehicle, an electronically accessible vehicle, an autonomous vehicle, or similar. Each vehicle 614 includes a variety of vehicle components, such as a processor, a memory, and a wireless communication module with which the vehicle may communicate with the vehicle management module 608, the vehicle cloud service 602, a wireless mobile client device 624, and/or third-party cloud services 616. In some embodiments, the processor, memory, and wireless communication module operate in concert to perform the functions of a gateway 300 in communication with the vehicle management module 608, vehicle cloud service 602, and/or one or more third-party cloud service 616. In other embodiments, the vehicle(s) 614 further includes a gateway 300 in communication with the vehicle management module 608, vehicle cloud service 602, and/or one or more third-party cloud service 616.

The network 612 can be a Local Area Network ("LAN"), a Wide Area Network ("WAN"), the Internet, etc. The network 612 can include one or more broadband communication channels, such as a 5G wireless communications channel or a DOCSIS/DSL wired communications channel. Thus, for the purposes of this patent, the term "broadband" applies to any high bandwidth communications channel. In one embodiment, the broadband communication channels may be secured with a Hardware Security Module (HSM), which is not shown. In another embodiment, the broadband communication channels may be secured with secure socket layers (SSL) and/or the HTTPS protocol. Other methods of securing a broadband communication channel will readily suggest themselves to those of ordinary skill in the art.

At least two communication channels 626, 628 couple the vehicle cloud service 602 through the network 612 to one or more vehicle 614 and one or more third-party cloud service 616. Further, at least one communication channel 630 couples the mobile client device 624 and the one or more third-party cloud service 616 through the network 612. In the illustrative embodiment, communication channel 626 is a first broadband communication channel between the vehicle cloud service 602 and the one or more third-party cloud service(s) 616. In this embodiment, communication channel 628 is a second broadband communication channel between the vehicle cloud service 602 and the one or more vehicle 614. Further, communication channel 630 is a third broadband communication channel between the mobile client device 624 and the one or more third-party cloud service 616. In various embodiments, each third-party cloud service 616 of a plurality may have a unique broadband communication channel to the vehicle cloud service 602, and each vehicle of a plurality of vehicles may have a unique broadband communication channel to the vehicle cloud service 602.

In another embodiment, the second communication path 628 includes a local area network that supports the gateway of a vehicle 614 being communicatively coupled to a firewall (not shown) that is communicatively coupled to each network cloud component along a wide area network. The third communication path 630 includes a wireless carrier network operating a high bandwidth wireless protocol that supports communications between the wireless mobile client device 624 and each networked cloud component.

The wireless mobile client device 624 includes its own processor, memory, and wireless communication module facilitating both broadband communication channels and short-range wireless communication channels. The wireless mobile client device 624 can further include a mobile authentication application operating thereon. Thus, the wireless mobile device communicates over the third broadband communication channel with the one or more third-party vehicle cloud service 616, and over a short-range communication channel 632 with the one or more vehicle 614. The short-range communication channel 632 can operate using Bluetooth or Wi-Fi.

In some embodiments, the multi-channel system 600 includes a scanner that constantly scans communications and wireless communication channels for devices trying to access a vehicle 614 or gateway 300. These devices may be registered, unregistered, registered anonymously, or any combination thereof. Thus, certain devices trying to access the vehicle 614 may be unregistered and considered a rogue device and/or user.

Figure 7A:
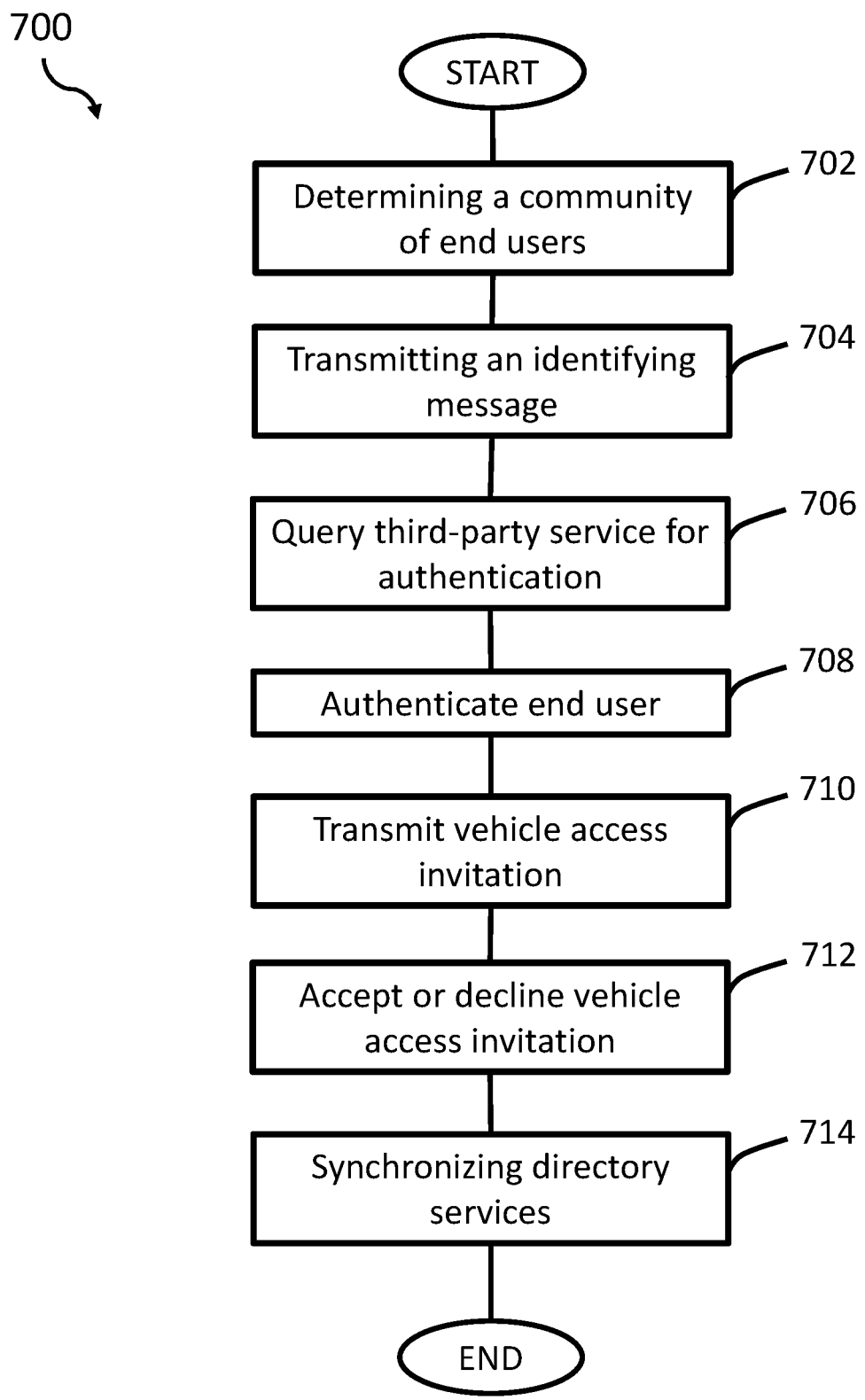
FIG. 7A shows a flowchart for the operation of a dual channel authentication architecture supporting a vehicle access application.

With reference now to FIG. 7A, there is shown a flowchart for an illustrative method of managing a vehicle cloud service 700 with the multi-channel system 600 of FIG. 6. In the illustrative embodiment, the method 700 is initiated at step 702 by the third-party vehicle cloud service 616 determining a community of end users associated with the third-party vehicle cloud service 616. The end users comprising this community are authorized to access one or more of a plurality of vehicles 614 in a fleet, or any one of a variety of features specific to those vehicles. In one embodiment, the third-party vehicle cloud service 616 determines the community of end users by associating each end user with one or more element of identifying information that can include a user profile, at least one user credential indicating the end user has a valid driving license, and a plurality of user preferences, such as vehicle settings, mirror settings, seat settings, and engine settings. This association may occur during a registration or other initial event where the identifying information is received and/or stored in the database 620.

At step 704, the method continues when a wireless mobile client device 624 requests access to a vehicle 614 by transmitting or broadcasting identifying information. in one embodiment, the wireless mobile client device 624 transmits this identifying information over the third broadband communication channel 630 to the third-party vehicle cloud service 616. In another embodiment, the wireless mobile client device 624 transmits the identifying information to the vehicle management module, and the vehicle management module is then responsible for determining the authenticity of the identifying information. In still another embodiment, the wireless mobile client device 624 transmits the identifying information to the vehicle management module, and the vehicle management module than queries the third-party vehicle cloud service 616 to ascertain the authenticity of the identifying information. Where the vehicle management module 608 is located on the network component 610, the wireless mobile client device 624 transmits its identifying information through the network 612 over a broadband communication channel to the vehicle management module 608. Where the vehicle management module 608 is located on the vehicle 614, the wireless mobile client device 624 transmits the identifying information over the short-range communication channel 632 to a vehicle management module operating on the vehicle 614.

In various embodiment, this identifying information can include an access request for a vehicle, or a particular type of vehicle (such as an electric vehicle, a construction vehicle, an autonomous vehicle, a truck, etc.).

At step 706 the third-party vehicle cloud service 616 is queried with the identifying information for authentication of the end user. Where the wireless mobile client device 624 transmits its identifying information to the vehicle management module 608, the vehicle management module 608 queries the third-party vehicle cloud service 616 for authentication of the end user associated with the identifying information. Where the wireless mobile client device 624 transmits its identifying information directly to the third-party vehicle cloud service 616, the third-party vehicle cloud service 616 may query its associated database 620 for authentication of the identifying information.

At step 708, the third-party vehicle cloud service 616 can compare the transmitted identifying information to the identifying information stored in the third-party vehicle cloud service database 620 to authenticate the identity of the end user and/or wireless mobile client device 624. In some embodiments, the third-party vehicle cloud service 616 generates an authentication associated with the received identifying information and end user, and transmits this authentication to the vehicle cloud service 602 through the network 612 over the first broadband communication channel 626. In various embodiments, the authentication may take the form of an authentication message.

At step 710, the vehicle management module 608 transmits a digital vehicle access invitation to the wireless mobile client device 624. In the illustrative embodiment, the digital vehicle access invitation is generated by the vehicle cloud service 602 through the key generation module 606 and communicated to the vehicle management module 608 for distribution to the wireless mobile client device 624. In the illustrative embodiment, the vehicle management module 608 transmits the vehicle access invitation over the second broadband communication channel 628 to the vehicle 614, where the vehicle 614 then broadcasts the digital vehicle access invitation over the short-range wireless communication channel 632 to a wireless mobile client device 624 within a broadcast range of the gateway associated with the vehicle. In an alternative embodiment, the vehicle management module 608 transmits the digital vehicle access invitation directly to the wireless mobile client device 624 through the network 612 over a broadband communication channel. In another embodiment, the vehicle management module 608 generates the digital vehicle access invitation and transmits the invitation to the wireless mobile client device 624.

Each digital access invitation is unique to the end user and/or wireless mobile client device 624 requesting access to a vehicle 614. This uniqueness arises from the inclusion of at least one element of the identifying information from an access request in the digital access invitation so that only the wireless mobile device 624 having the identifying information can use the digital access invitation. During generation of a digital access invitation, the vehicle cloud service 602 may include one or more element of the identifying information by concatenating the identifying information element to a digital access invitation and hashing the concatenation. In another embodiment, the vehicle cloud service 602 encrypts the digital access invitation using an element of identifying information, so that only a wireless mobile client device 624 containing the element of identifying information is capable of decrypting the digital access invitation and using it to access a particular vehicle 614.

At step 712, the wireless mobile client device 624 receiving the broadcasted digital access invitation may accept or decline the invitation. In some embodiments, the wireless mobile client device 624 accepts the invitation by using the invitation to access the associated vehicle 614. In other embodiments, the mobile wireless mobile client device 624 accepts the invitation by communicating an invitation acceptance message to the vehicle 614. In still other embodiments, the mobile wireless mobile client device 624 accepts the invitation by communicating an invitation acceptance message to the vehicle management module 608. In yet other embodiments, the mobile wireless mobile client device 624 accepts the invitation by communicating an invitation acceptance message to the vehicle cloud service 602. In further embodiments, the mobile wireless mobile client device 624 accepts the invitation by communicating an invitation acceptance message to the third-party vehicle cloud service 616.

In some embodiments, the wireless mobile client device 624 declines the invitation by failing to use or exercise the invitation during an active time period associated with the invitation, after which time period the invitation expires. In other embodiments, the mobile wireless mobile client device 624 declines the invitation by communicating an invitation declination message to the vehicle 614. In still other embodiments, the mobile wireless mobile client device 624 declines the invitation by communicating an invitation declination message to the vehicle management module 608. In yet other embodiments, the mobile wireless mobile client device 624 declines the invitation by communicating an invitation declination message to the vehicle cloud service 602. In further embodiments, the mobile wireless mobile client device 624 declines the invitation by communicating an invitation declination message to the third-party vehicle cloud service 616.

At step 714, a synchronization module synchronizes the one or more third-party directory services 618 with the vehicle directory service 604. This synchronization is performed according to digital vehicle access invitations generated and distributed to the end user. Thus, the synchronization module synchronizes directory services among a plurality of cloud services by updating those directory services to reflect generated digital access invitations issued to one or more wireless mobile client device 624, accepted invitations, and declined invitations. When the synchronization module updates directory services according to declined digital invitations, it removes the unique authorization associated with that digital invitation from the directory services. The synchronization module also operates to synchronize the directory services when one or more digital access invitation time period expires.

Figure 7B:
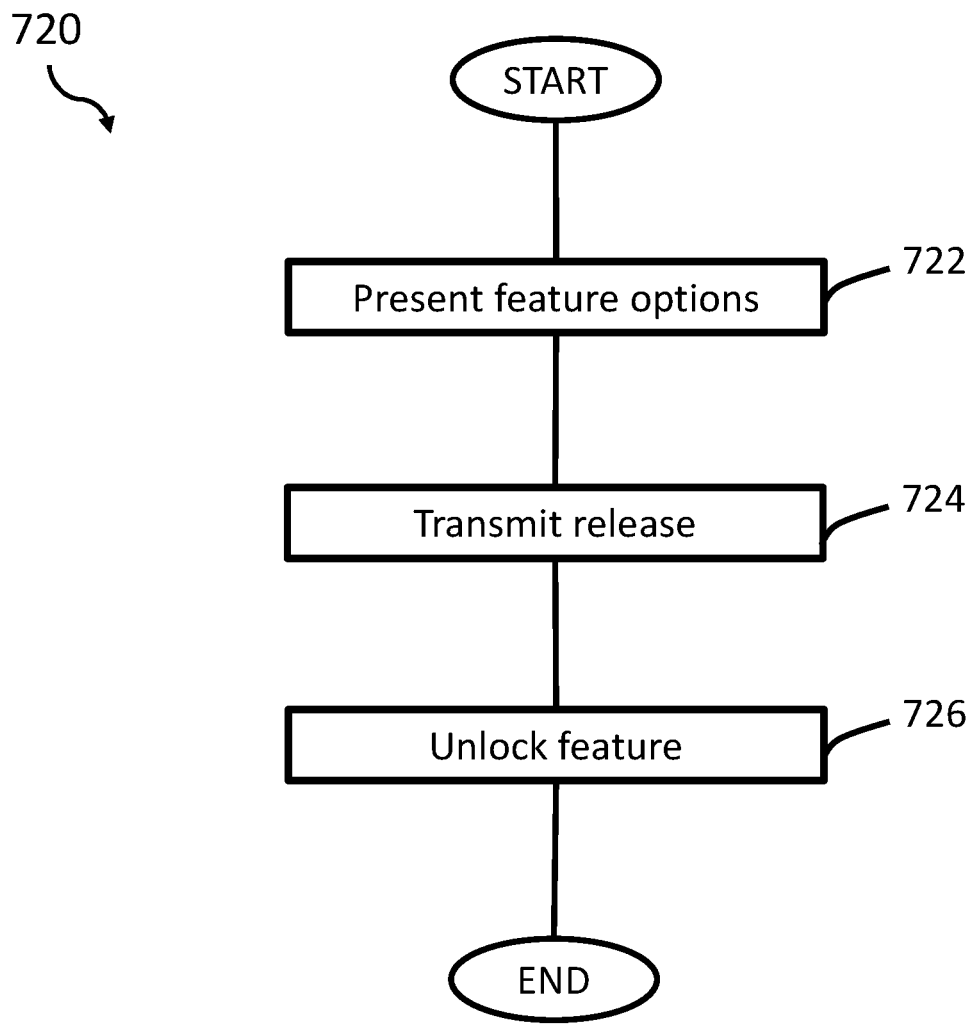
FIG. 7B shows a flowchart for the release of end user information and unlocking of vehicle features.

Referring now to FIG. 7B, there is shown a flowchart 720 for the method of releasing end user information and unlocking of vehicle features. The method 720 begins at step 722 an end user is presented with one or more optional features of the vehicle 614 that are locked and inaccessible to the end user. This presentation of feature options may occur on the wireless mobile client device 624.

The presented features can include luxury add-on features (e.g., private mode that shuts off any internal cameras, sport mode that increases accessible power, teenager mode that limits power and/or hours of operation (e.g., only during daylight or from 6 AM to 10 PM), XM satellite radio, etc.), feature upgrades (e.g., upgrading from compact to sedan, or base model to luxury model), corollary add-on features (e.g., a private mode that disengages interior cameras, a dog mode that maintains interior temperatures below a predetermined value (i.e., in one embodiment the predetermined value is 78F)), a remote starter feature, a movie theater mode feature (i.e., access to a library of movies viewable in the vehicle), and a data analysis feature comprised of tracking systems of the vehicle(s) that monitor various vehicle identifiers: license plate colors, vehicle colors, vehicle type, vehicle characteristics, vehicle brand, vehicle model, and driving speed.

The presentation includes a request that the end user release access to their identifying information in exchange for unlocking access to one or more of the presented features. Further, the presentation receives an end user selection made on the wireless mobile client device 624 of one or more feature to which the end user will receive access.

At the step 724, the end user transmits a release granting access to their identifying information or authorizing tracking of their cloud service usage (i.e., tracking vehicle location during rental). The release allows the vehicle cloud service 602 and/or the third-party vehicle cloud service 616 to use, copy, and/or share the end user's identifying information.

At step 726, the entity receiving the release unlocks the one or more requested feature. In one embodiment, the vehicle management module 608 unlocks the requested feature. In another embodiment, the vehicle cloud service 602 unlocks the requested feature. In still a further embodiment, third-party vehicle cloud service 616 unlocks the requested feature. When the vehicle management module 608 or the vehicle cloud service 602 receive the release, they forward the release over the network 612 to the third-party vehicle cloud service 616.

Figure 8:
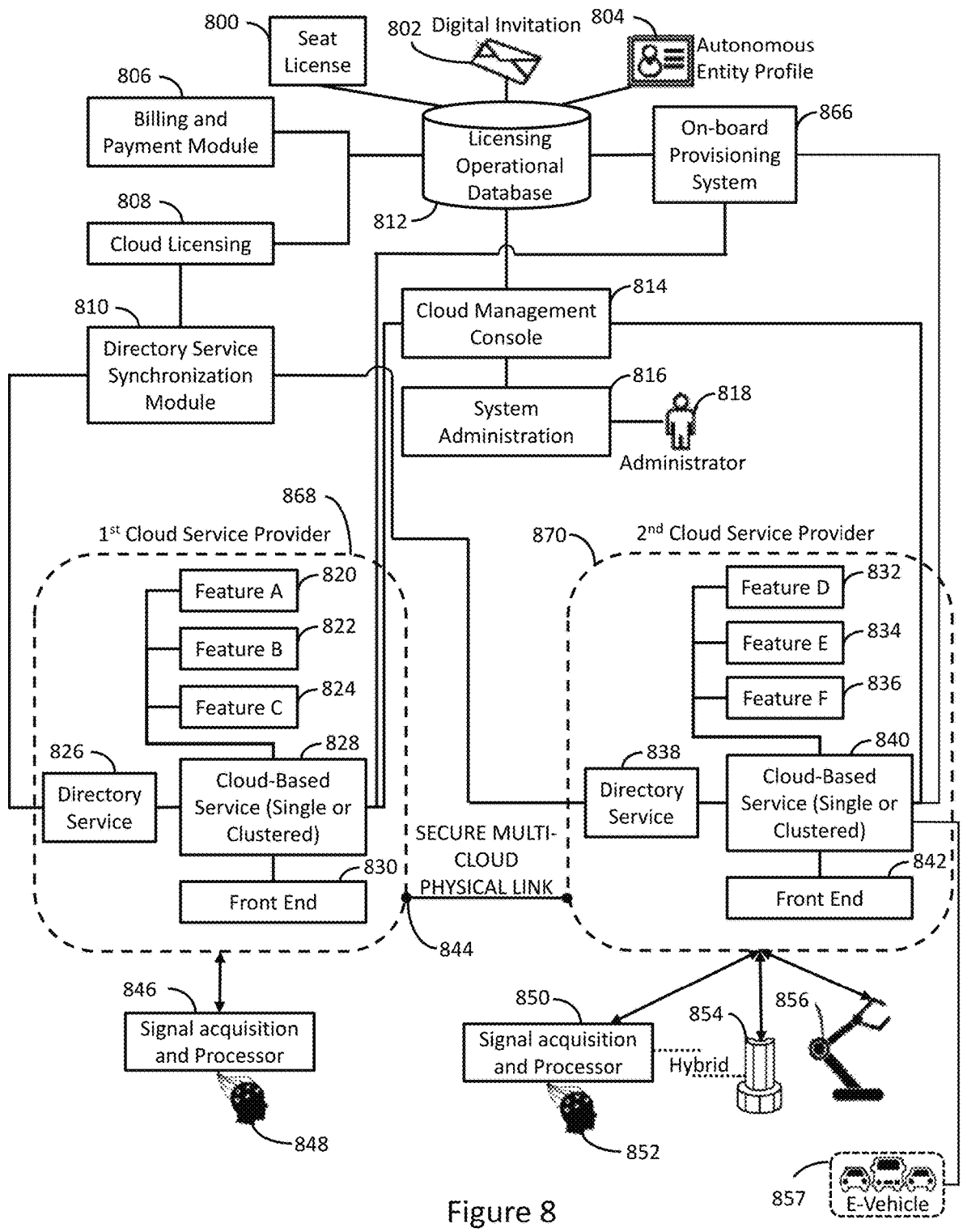
FIG. 8 shows a flowchart describing a method for managing an autonomous licensing entity with a per-seat license level using a digital invitation in a multi-cloud architecture.

Referring to FIG. 8, there is shown a further embodiment where an autonomous entity with a per-seat license 800 requests usage of another autonomous entity bonded to the per-seat license. The system and method for managing autonomous licensing entities include machine-to-machine (M2M) or natural-to-natural (N2N) interactions and combinations.

The architectural diagram of FIG. 8 describes a system comprising the elements of a per-seat license 800, a digital access invitation 802, and an autonomous entity profile 804 stored in a Licensing Operational Database 812 or equivalent storage. The system includes a cloud billing module 806, a cloud licensing module 808, and an on-board provisioning system 866 communicatively coupled to the Licensing Operational Database 812. A Directory Service Synchronization Module 810 is in charge of synchronizing directory services among a plurality of cloud services 868 and 870. A Cloud Management Console 814 is communicatively coupled to a System Administration 816 used by administrators 818 of the multi-cloud 868, 870. Cloud services 868 and 870 include a plurality of features 820, 822, 824, 832, 834, 836, a directory service 826, 838, a Front End 830, 842, and a Cloud-Based Service (Single or Clustered) 828, 840. Additionally, a secure multi-cloud physical link is shown 844.

Furthermore, signal acquisition and processor modules 846, 850 are communicatively coupled to natural intelligence with a per-seat license 848 and natural intelligence without a per-seat license 850 for surrogate operations or natural-to-natural (N2N) interactions. The natural intelligence 852 may be assisted by a supercomputer 854 in a hybrid mode. In addition, the natural intelligence with a per-seat license 848 is able to interact with a plurality of autonomous entities, such as the illustrative robotic arm 856, and with other endpoints, such as the illustrative e-vehicles 857. In the illustrative embodiment, the natural intelligence 852 receives authorization corresponding to a per-seat license to engage in non-metered or metered usage/control of the autonomous robotic arm 856 or one or more of the e-vehicles 857.

The computational requirements to process invasive or noninvasive brain controller interfaces (BCI) feeding streams of data would require additional storage, processing, and bandwidth than a simple request using an application programming interface (API).

Computer-brain interfaces can be invasive or noninvasive. A plurality of computer brain technologies for signal acquisition include but are not limited to Electroencephalogram (EEG), Electrocorticography (ECoG), extracellular Action Potentials (APs), Local Field Potentials (LFP), et al. The processor may include signal processing functions using autoregression, wavelets, Fourier transforms, Laplacian filters, and other spatial filters.

Figure 9:
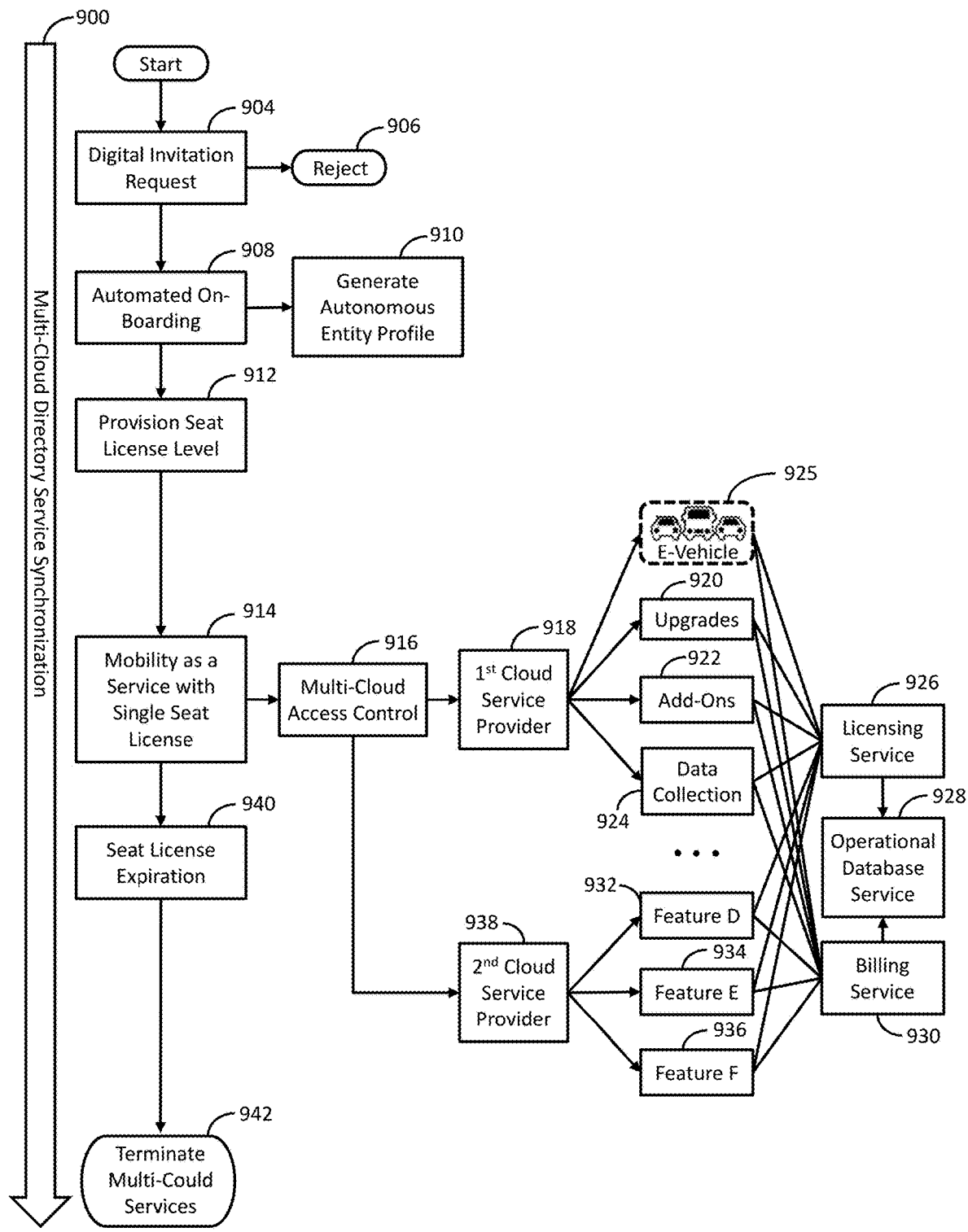
FIG. 9 shows an embodiment of the system and method for a first cloud service linked to a fleet of autonomous vehicles and a second cloud service linked to at least one electronically accessible vehicle.

Regarding the flowchart illustrated in FIG. 9, an autonomous entity acquires a digital invitation from an on-board provisioning system using an internal endpoint 904. The autonomous entity may REJECT 906 a previously offered or requested invitation if an intelligent module determines that the state desired from a particular digital invitation has been reached through other means including local computations. Therefore, a REJECT would release a per-seat license assigned to a digital invitation and a directory service synchronization registers the REJECT by updating the Licensing Operational Database to reflect the autonomous entity REJECT. In turn, the Directory Service Synchronization module updates the directory service corresponding to the rejected digital invitation by removing the unique authorization associated with the digital invitation. The on-boarding process 908 comprises registering an autonomous entity unique identifier automatically by the autonomous entity using an internal endpoint 910.

In one embodiment, the cloud management module first queries an endpoint for identifying information that can include personal identification information prior to transmitting a digital invitation that can be a vehicle access invitation. In response, the queried client device transmits an identifying message that includes the requested personal identification information back to the cloud management module. The cloud management module then transmits a second query requesting the user profile associated with the queried client device. The client device then transmits a responsive message to the cloud management module that includes the requested user profile.

In some embodiments, the vehicle access invitation is transmitted to the client device when the user profile associated with the client device is received by the cloud management module. In so doing, the synchronization module and the cloud management module operate so that the upper limit of the per-seat license is not exceeded. In further embodiments, upon receiving a vehicle access invitation the client device transmits an invitation acceptance to one of the cloud management module, the cloud service directory service, or the synchronization module. The synchronization module, cloud management module, and cloud service directory service operate individually or in concert to synchronize the directory service according to one or more invitation acceptance. Similarly, upon receiving a vehicle access invitation the client device may transmit an invitation declination to one of the cloud management module, the cloud service directory service, or the synchronization module. The synchronization module, cloud management module, and cloud service directory service operate individually or in concert to synchronize the directory service according to one or more invitation declination. When the cloud management module receives either an invitation acceptance or an invitation declination the cloud management module determines whether the invitation acceptance and/or declination exceeds the upper limit of end users. When the cloud management module determines that the upper limit of end users is exceeded, the cloud management module denies access to the cloud service. Alternatively, when the cloud management module determines that the upper limit of end users is not exceeded, the cloud management module authorizes access to the cloud service.

In further embodiments, the second query includes a request for a release associated with the user profile. Additionally, the responsive message includes a release that allows the cloud management module to use, reproduce, and transfer any and all information in a received user profile.

At step 912, a per-seat license is provisioned to the autonomous entity for cloud service utilization, and a unique identifier from the autonomous entity is used to create an initial autonomous user profile for directory services 912. The initial autonomous user profile includes only the unique identifier from the autonomous entity, and can be expanded to including further information. The autonomous entity's use of the per-seat license or the associated cloud service may be tracked and used to buildout the autonomous user profile with tasks performed, associated times and locations, etc. In further embodiments, the cloud service or the Licensing Operation Database can simultaneously request a user profile from the autonomous entity and provide a reward. The reward can be a time extension for the provisioned per-seat license or access to additional cloud service features. Thus, a cloud service providing access to a rental electronically accessible vehicle (e-vehicle) may offer luxury add-on features (e.g., private mode that shuts off any internal cameras, XM satellite radio, etc.) or upgrades (e.g., upgrading from compact to sedan, or base model to luxury model) to users that grant access to their user profile or authorize tracking of their cloud service usage (i.e., tracking vehicle location during rental). In this embodiment, one of the cloud service directory services, the directory service synchronization module, or the licensing operational database can record endpoint utilization to buildout a user profile created during the onboarding process. The user profile can thus be built-out with information detailing location, billing details, etc. from a user's cloud service utilization.

In various embodiments, the endpoint or client device includes a user profile associated with the end user of the endpoint. In further embodiments, the endpoint includes personal identification information that may be associated with the endpoint and/or the end user of the endpoint.

MaaS with a single per-seat license 914 is a process including multi-cloud access control 916 to at least a first cloud service 918 and a second cloud service 938. The first cloud service 918 includes a plurality of distinct features including upgrades 920, add-ons 922, data collection 924, and one or more rental e-vehicles 925. The second cloud service provider 938 includes a second plurality of distinct features 932, 934, 936. Moreover, a licensing service 926 and a billing service 930 manage the plurality of distinct features using an operational database service 928. In an illustrative embodiment, the first cloud service 918 is an electronically accessible vehicle rental cloud service including features that can be various electronically accessible rental vehicles comprising a fleet of electronically accessible rental vehicles associated with the electronically accessible vehicle rental cloud service. The features can also include upgrades 920 or corollary add-on 922 features for a particular electronically accessible rental vehicle, such as, a private mode that disengages interior cameras, a dog mode that maintains interior temperatures below a predetermined value (i.e., in one embodiment the predetermined value is 78F), a remote starter, a movie theater mode (i.e., access to a library of movies viewable in the vehicle), etc.

Billing and payment automation among autonomous entities is based on the passive identification of autonomous entities. The passive identifiers may derive from a plurality of technologies and include radio identifiers, biometrics, and camera recognition. A licensing payment system is comprised of a client, a licensing operator, and a seller. In this embodiment, the client is an autonomous entity, the licensing operator manages the system and method, and the seller is the provider of goods or services.

A per-seat license expiration 940 would terminate access to the associated cloud features or multi-cloud services 942. Thus, each per-seat license includes a time period of validity, the expiration of which invalidates the per-seat license or an end user's access to a per-seat license. In addition, access is terminated upon failure to authenticate payment, license expiration, lack of funds, etc. The synchronization module operates to synchronize the cloud service directory service when one or more per-seat license time period expires. Synchronization between cloud service providers is enabled by a multi-cloud directory service synchronization process 900. The multi-cloud directory service synchronization process 900 allows data collected from one cloud service to be utilized by one or more other cloud services in the multi-cloud.

The system and method for managing an autonomous licensing entity provide access control to a plurality of cloud service features. The cloud service features may contain a collection or bundle of operations associated with a per-seat license or payment scheme including but not limited to automated clearing house (ACH), debit card, credit card, PayPal, cryptocurrency (such as Bitcoin, Litecoin, Ethereum), Blockchain (such as Ripple, Stellar, PayCommerce, Streami or PhunCoin), barter of data or information (such as PhunCoin or GoGet), lead generation, or volume enterprise licensing with payment terms, such as Net 30 or Net 90. A cloud licensing module manages the per-seat license supplied by the autonomous entity, authorizing use of the cloud service and/or updating the directory service with the number and/or identity of active per-seat licenses and autonomous entities.

A billing module registers the costs associated with managing per-seat licensing entities as opposed to regulating usage. The plurality of features includes a variety of capabilities of varying degrees and complexities that may incur a separate charge for each feature or capability that is managed by a billing and payment module. Furthermore, a directory service synchronization module is responsible for synchronizing directory services across cloud services.

A directory service offers the ability to map autonomous entities to particular addresses. A plurality of services provided by directory services includes replication, which is the distribution of directory data across a plurality of geographically distributed servers serving as a coalesced unit of data for control and management. Furthermore, the directory service is optimized for data searching and retrieval of one or more autonomous entity profiles.

An organizational unit is defined as a plurality of autonomous entities of a particular group with a plurality of common denominators. Typically, the hierarchical infrastructure of the organizational units is determined by pre-configured groups in the hierarchical organization of a network of autonomous entities.

The system and method support the X.500 standard protocol for integration and interoperability with an autonomous entity. The X.500 standard protocol is supported by a plurality of services such as Directory Access Protocol (OAP), Directory System Protocol (DSP), Directory Information Shadowing Protocol (DISP), Directory Operational Bindings Management Protocol (DOP), Lightweight Directory Access Protocol (LDAP). Furthermore, implementations using LDAP include Active Directory and OpenLDAP.

A global catalog is a distributed data repository comprising a multi-domain directory forest designated as global catalog servers and distributed through multi-master replication. The Global catalog provides the ability to locate objects from any domain without having to specify a particular domain name. The global catalog server is a domain controller that stores a partial, read-only replica of all other domain directory partitions in the forest. The system has the ability to manage information about objects such as countries, organizations, people (natural intelligence), robots, drones, smart appliances, unmanned vehicles, endpoint vehicles, autonomous virtual desktops (artificial intelligence) or hybrids.

The functionality provided by the directory service enables search and browser information by a name. The name identifies the object allowing an autonomous entity to self-discover other entities in the organizational hierarchy. In addition, the directory services provide centralized authentication, authorization, accounting, and payments.

The plurality of functions provided by the directory service includes autonomous systems for administrative tasks facilitating a centralized management system. The centralized management system provides commands in the form of instructions to an endpoint.

Endpoints integrated into autonomous entities may request services from multiple cloud service providers concurrently.

The system and method synchronizes billing and licensing among a plurality of cloud services and separate or integral secure enclaves. The number of features provided by a cloud service is determined by the availability of resources supporting the plurality of cloud services. Per-seat licenses provisioned to autonomous entities may occur at rates faster than requests originated by human-assisted interaction (e.g., manual mode). An autonomous entity usurp control of an endpoint utilized by a natural intelligence to request licensed cloud services without human intervention. For instance, a per-seat license for cloud services may be automatically requested by an autonomous entity in order to set up and use cloud services to satisfy a condition or state required to perform a self-governing function.

Figure 10:
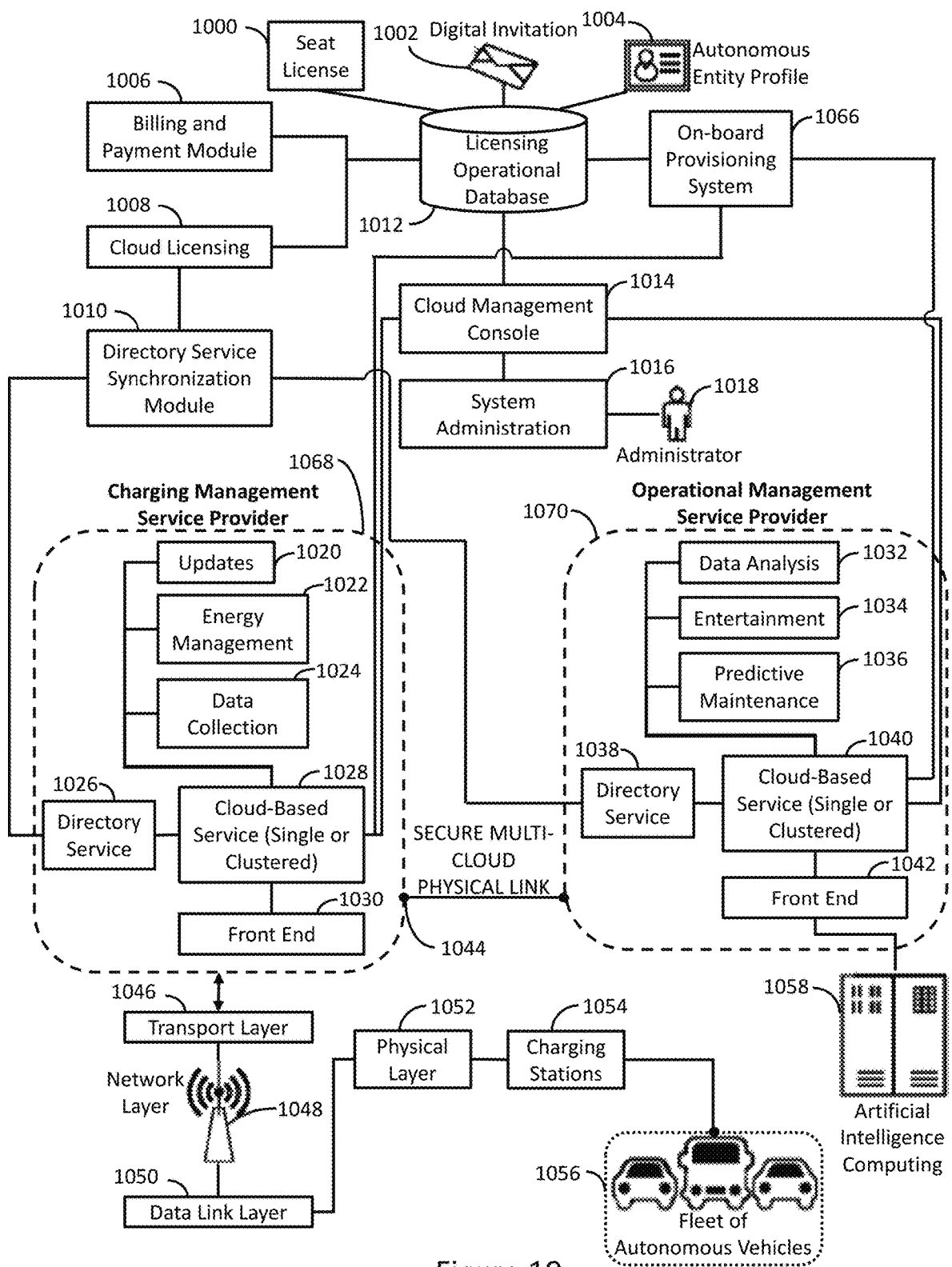
FIG. 10 shows a cloud management console having a hierarchical network Administrator framework for controlling per seat licenses for cloud services.

The illustrative embodiment shown in FIG. 10 contains a plurality of autonomous vehicles utilizing a plurality of cloud services through a charging station and a valid per-seat license. The architecture describes a system comprising elements such as a per-seat license 1000, a digital invitation 1002, and an autonomous entity profile 1004 stored in a Licensing operational database 1012 or equivalent storage. The system includes a cloud billing module 1006, a cloud licensing module 1008, and an on-board provisioning system 1066 communicatively coupled to the Licensing operational database 1012. A Directory Service Synchronization Module 1010 is in charge of synchronizing directory services among a plurality of cloud services 1068 and 1070. A Cloud Management Console 1014 is communicatively coupled to a System Administration system 1016 used by administrators 1018 of the multi-cloud 1068, 1070. Cloud services 1068, 1070 include a plurality of distinctive features 1020, 1022, 1024, 1032, 1034, 1036, a directory service 1026, 1038, a Front End 1030, 1042, and a Cloud-Based Service (Single or Clustered) 1028, 1040. A secure multi-cloud physical link is shown 1044.

The charging management service provider 1068 includes the distinct features of updates 1020, energy management 1022, and data collection 1024. The operational management service provider 1070 includes separate distinct features that require Artificial Intelligence computing, such as data analysis 1032, entertainment 1034, and predictive maintenance 1036. The data analysis feature is comprised of tracking systems of vehicles that monitors various vehicle identifiers: license plate colors, vehicle colors, vehicle type, vehicle characteristics, vehicle brand, vehicle model, and driving speed.

A multilayer architecture is shown with a transport layer 1046, a network layer 1048, a data link layer 1050, a physical layer 1052, a plurality of charging stations 1054, and a fleet of autonomous vehicles 1056. The transport layer 1046 provides logical communication between application processes running on different hosts within the multilayer architecture and enables end-to-end communication over the multilayer architecture. The network layer 1048 is responsible for packet forwarding, i.e. routing through intermediate routers. The data link layer 1050 is a protocol-based layer that moves data into and out of the physical link 1044 between the charging management service provider 1068 and the operational management service provider 1070. The physical layer 1052 enables bit-level transmission between charging stations 1054 and autonomous vehicles 1056 by synchronizing communication.

A plurality of autonomous vehicles would need a charging station with MaaS, which is a fundamental characteristic of a machine-to-machine economy with per-seat licenses. An autonomous vehicle is further defined as a self-governing entity capable of performing at least autonomous steering, autonomous navigation, high inference rates, high response time, emergency services, and collision avoidance maneuvers.

The charging stations 1054 constitute the interface between an autonomous vehicle, the plurality of cloud services, and an artificial intelligence computer.

MaaS is a real-time service for seamless mobility offered to an autonomous entity using a plurality of cloud services for data aggregation and processing. In another embodiment, a Maas service models include per-seat licenses for subscription business models or over the top services. Furthermore, in one embodiment, a swarm of autonomous vehicles perform transportation services for users with a per-seat license. These transportation services could supplant traditional car ownership models, allowing individual owners to provide rental taxi services on a piece-meal basis; or allowing taxi and car rental agencies to provide driverless (i.e., autonomous vehicle) experiences. In this embodiment, an autonomous vehicle is available to a plurality of users with a per-seat license on demand.

In addition, the embodiment of FIG. 10 includes a per-seat license that allows non-metered usage as opposed to metered usage because the embodiment is considered to be a monolithic environment where a plurality of autonomous entities coexist as a pool of resources available to customers or end users/endpoint devices. An artificial intelligence employs data analysis to keep track of various devices designed to measure time, distance, speed, energy consumption, the flow of energy, etc.

Figure 11:
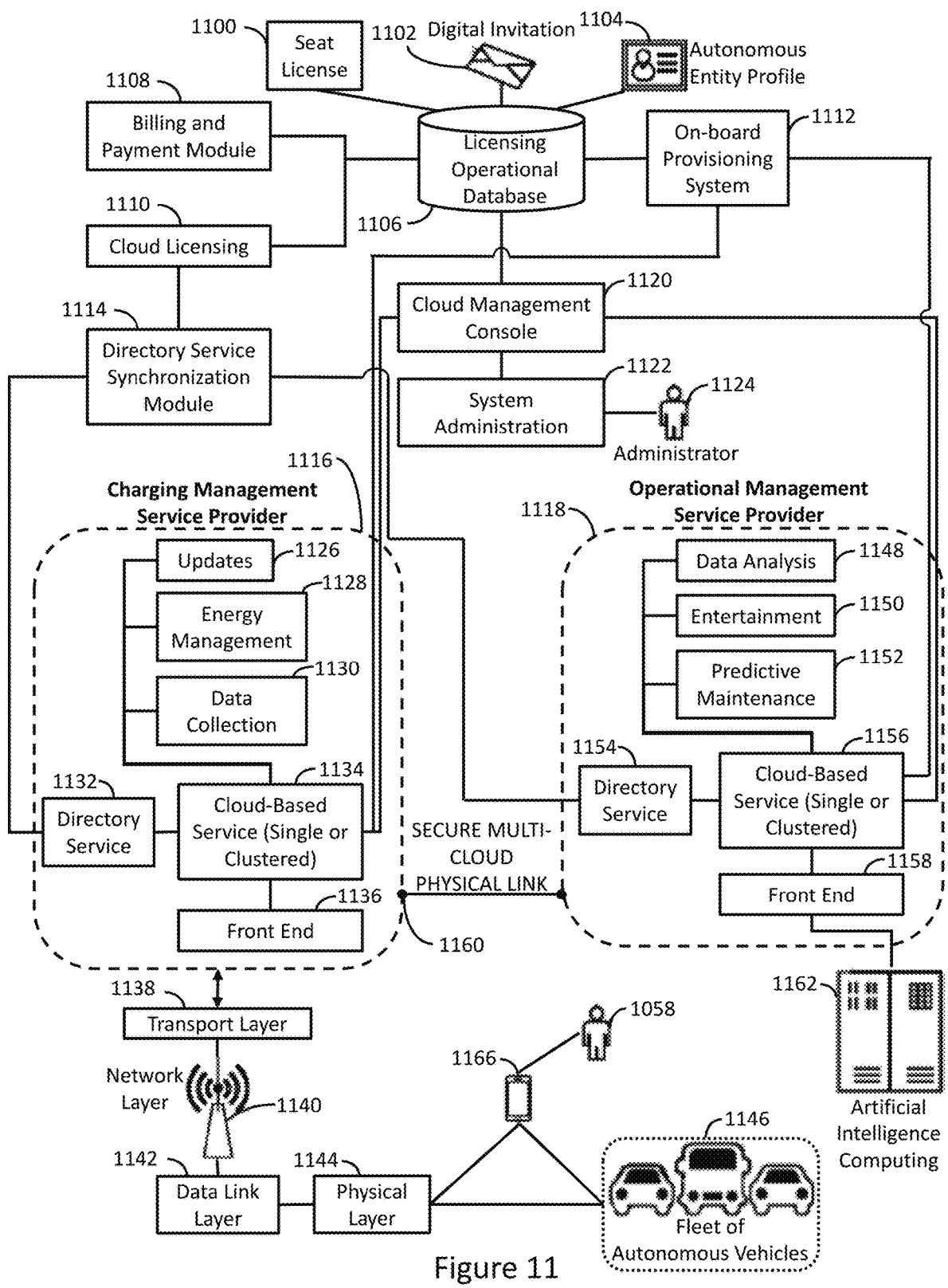
FIG. 11 shows a flowchart of an embodiment of the system and method for a plurality of autonomous entities using a physical layer, a network layer, and a multi-cloud layer.

The illustrative embodiment shown in FIG. 11 contains a plurality of electronically accessible vehicles (e-vehicles) utilizing a plurality of cloud services over a wireless network according to a valid per-seat license. The architecture describes a system comprising elements such as a per-seat license 1100, a digital invitation 1102, and an autonomous entity profile 1104 stored in a Licensing operational database 1106 or equivalent storage. The system includes a cloud billing module 1108, a cloud licensing module 1110, and an on-board provisioning system 1112 communicatively coupled to the Licensing operational database 1106. A Directory Service Synchronization Module 1114 is in charge of synchronizing directory services among a plurality of cloud services 1116 and 1118. A Cloud Management Console 1120 is communicatively coupled to a System Administration system 1122 used by administrators 1124 of the multi-cloud 1116 and 1118. Cloud services 1116 and 1118 include a plurality of distinctive features 1126, 1128, 1130, 1148, 1150, 1152, a directory service 1132, 1154, a Front End 1136, 1158, and a Cloud-Based Service (Single or Clustered) 1134, 1156. A secure multi-cloud physical link is shown 1160.

The vehicle access cloud service 1116 includes the distinct features of upgrades 1126, add-ons 1128, and data collection 1130. The operational management service provider 1118 includes separate distinct features that require Artificial Intelligence computing 1162, such as data analysis 1148, entertainment 1150, and predictive maintenance 1152. The data analysis feature is comprised of tracking systems of vehicles that monitors various vehicle identifiers: license plate colors, vehicle colors, vehicle type, vehicle characteristics, vehicle brand, vehicle model, and driving speed.

A multilayer architecture is shown with a transport layer 1138, a network layer 1140, a data link layer 1142, a physical layer 1144, and a fleet of electronically accessible vehicles (e-vehicles) 1146. The transport layer 1138 provides logical communication between application processes running on different hosts within the multilayer architecture and enables end-to-end communication over the multilayer architecture. The network layer 1140 is responsible for packet forwarding, i.e. routing through intermediate routers. The data link layer 1142 is a protocol-based layer that moves data into and out of the physical link 1160 between the charging management service provider 1116 and the operational management service provider 1118. The physical layer 1144 enables bit-level transmission between endpoints 1166 operated by a natural intelligence 1164 and e-vehicles 1146 by synchronizing communication, and bit-level transmission among e-vehicles 1146 by synchronizing communication.

A plurality of e-vehicles may require a charging station with MaaS, which is a fundamental characteristic of a machine-to-machine economy with per-seat licenses. This MaaS facilitated charging station may also support charging for e-vehicles operated by a natural intelligence in a natural-to-machine economy with per-seat licenses.

MaaS is a real-time service for seamless mobility offered to endpoints using a plurality of cloud services for data aggregation and processing. In another embodiment, a Maas service models include per-seat licenses for subscription business models or over the top services. Furthermore, a fleet of e-vehicles would be available for rental by users with a per-seat license, such as individuals requesting metered usage or corporate accounts requesting unmetered usage for constant and widespread availability. In this embodiment, an autonomous vehicle is available to a plurality of users with a per-seat license, such that only a single user utilizes a single e-vehicle at a given time. This system provides an alternative to existing car rental models that require administrative human interaction to facilitate a rental contract. Additionally, this system is not limited to providing and managing per-seat licenses for e-vehicles, but may extend to any electronically accessible machine, such as a robot, a drone, etc.

As discussed above, the embodiment of FIG. 11 includes a per-seat license that allows non-metered usage as well as measured usage, though the embodiment is considered to be a monolithic environment where a plurality of autonomous entities coexist in a pool of resources. An artificial intelligence employs data analysis to keep track of various devices designed to measure time, distance, speed, energy consumption, the flow of energy, et al.

Figure 12:
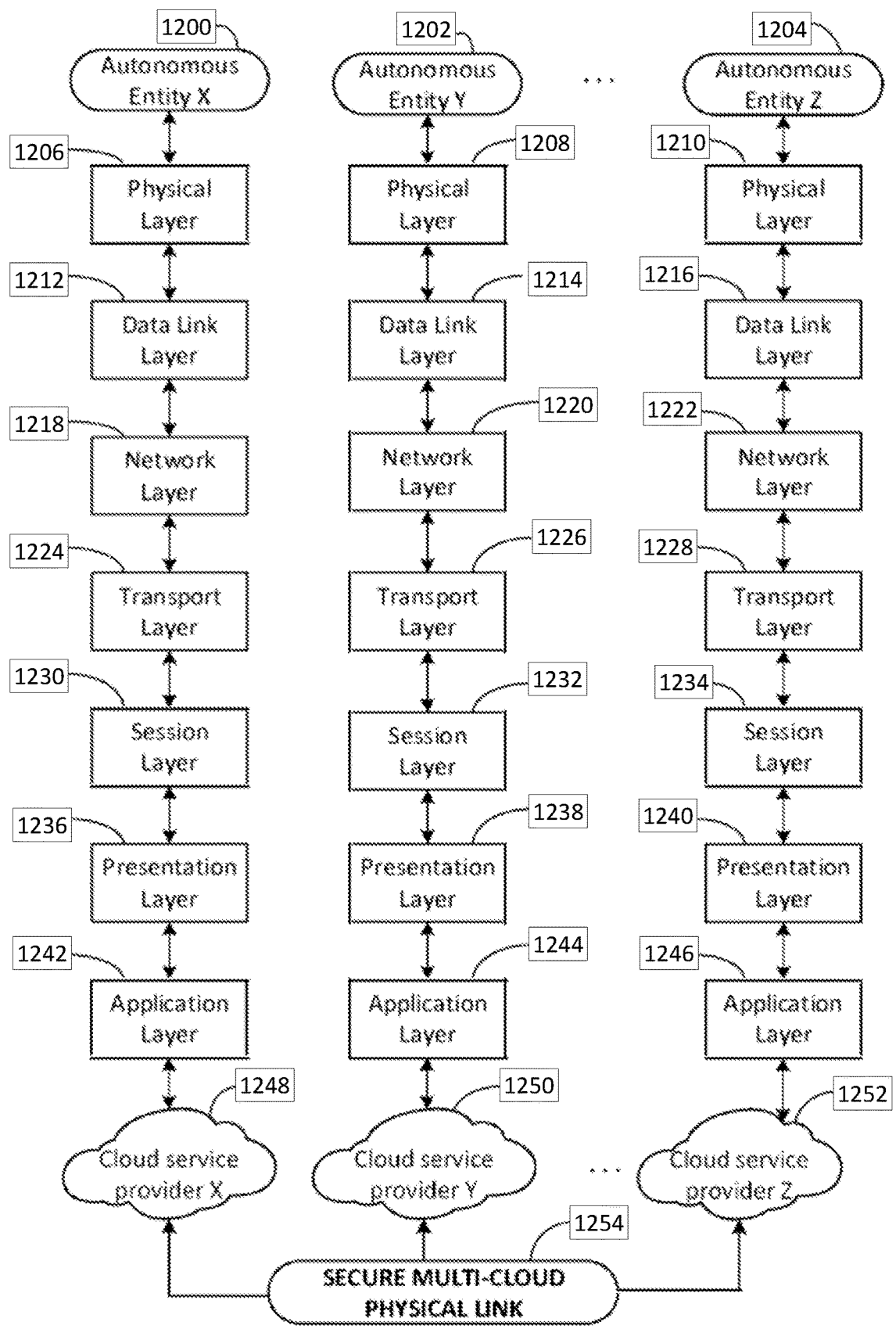
FIG. 12 shows a flowchart of a layer model using a multi-cloud architecture.

FIG. 12 shows a flowchart of a layer model using a multi-cloud architecture. In FIG. 12, a plurality of autonomous entities comprising autonomous entity X 1200, autonomous entity Y 1202, autonomous entity Z 1204 are communicatively coupled using a secure multi-cloud physical link 1254. The multilayer method includes a physical layer 1206, 1208, 1210, a data link layer 1212, 1214, 1216, a network layer 1218, 1220, 1222, a transport layer 1224, 1226, 1228, a session layer 1230, 1232, 1234, a presentation layer 1236, 1238, 1240, an application layer 1242, 1244, 1246, a cloud service provider layer 1248, 1250, 1252, and a secure multi-cloud physical link 1254.

Figure 13:
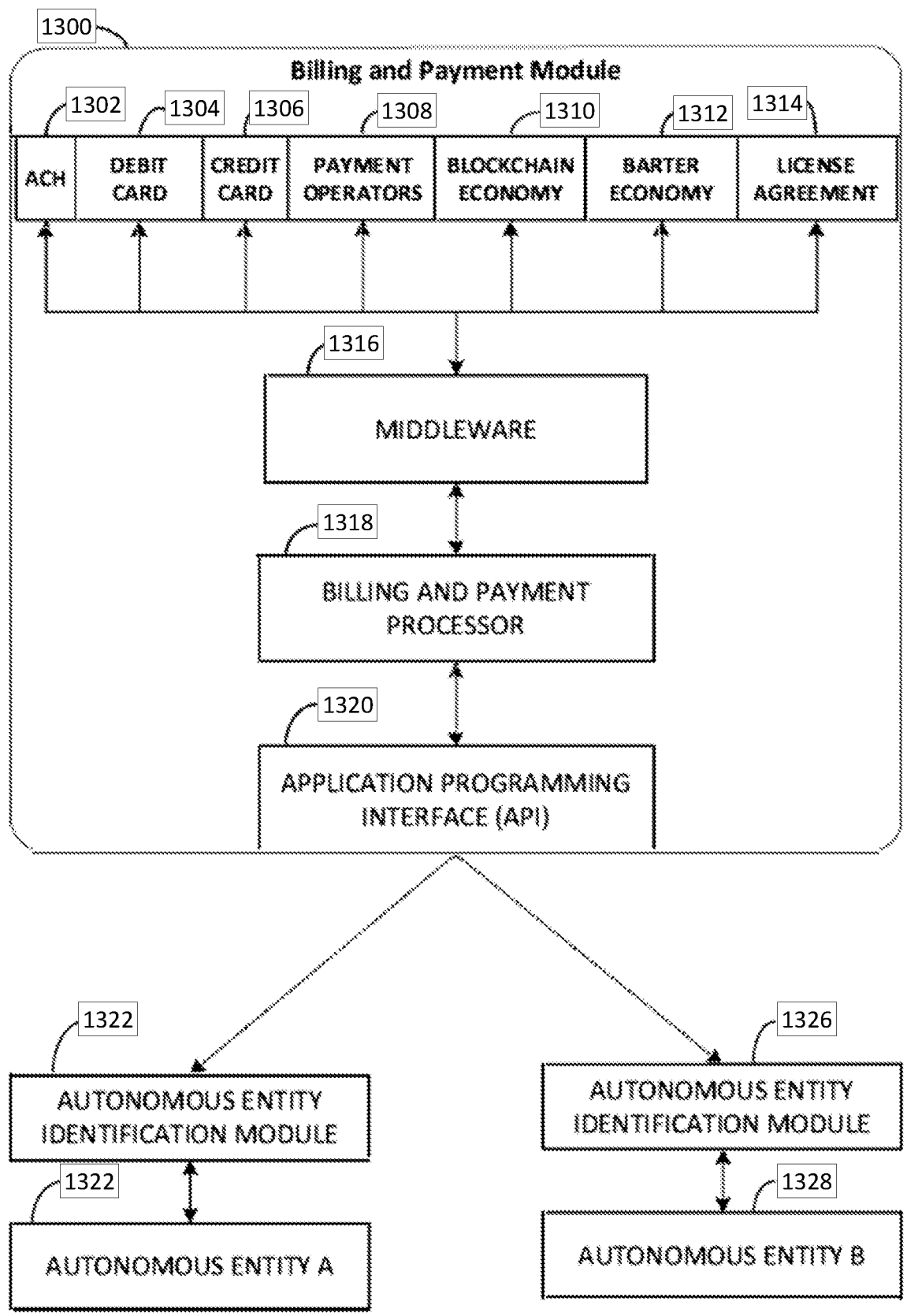
FIG. 13 shows an automated passive payment architecture for autonomous entities.

FIG. 13 shows an automated passive payment architecture for autonomous entities. The billing and payment module 1300 is comprised of a plurality of payment schemes such as automated clearing house (ACH) 1302, debit card 1304, credit card 1306, payment operators 1308, cryptocurrency and blockchain 1310, lead generation (not shown), barter for information or data exchange or advertisement or search results 1312, and license agreement 1314. A middleware 1316 provides an external interface to the plurality of payment schemes and a billing and payment processor 1312. In addition, the billing and payment module 1300 include a billing and payment application programming interface (API) for licensing payment using identification modules 1322, 1326 of autonomous entities A 1324 and autonomous entities B 1328. The billing and payment processor 1312 perform the authorization of billing and payment transactions.

The physical layer deals with the aspects of transmitting data using the best available WAN connection to transmit TCP/IP data. The data link layer deals with the transmission of packets over the physical link and error correction. The network layer establishes paths between autonomous entities for routing and switching. The transport layer transfers data between autonomous entities using flow control. The session layer relates and manages the per-seat licenses of autonomous entities. The presentation layer is responsible for presenting raw data from and to autonomous entities. The application layer deals with incompatibilities among autonomous entities by means of a custom interface. The cloud service provider layer includes a plurality of cloud service providers communicatively coupled with a multi-cloud physical link.

It is to be understood that the detailed description of illustrative embodiments are provided for illustrative purposes. Thus, the degree of software modularity for the transactional system and method presented above may evolve to benefit from the improved performance and lower cost of the future hardware components that meet the system and method requirements presented. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A method for managing a vehicle cloud service comprising:
   communicatively coupling, over a network, the vehicle cloud service to a vehicle management module associated with a vehicle;
   determining, by a third-party vehicle cloud service, a community of end users that can access the third-party vehicle cloud service, wherein the third-party vehicle cloud service operates on a third-party network component;
   transmitting, by a mobile client device, an identifying message to the vehicle management module, wherein the mobile client device associated with one end user of the community of end users, a user profile having a plurality of user preferences, and at least one user credential indicating the one end user has a valid driving license, wherein the identifying message includes a vehicle access request, the user profile, the user preferences and the user credential indicating the one end user has a valid driving license;
   querying, by the vehicle management module, the third-party vehicle cloud service for authentication of the one end user, wherein the query includes the identifying message;
   determining, by the third-party vehicle cloud service, that the user profile corresponds to an end user of the community of end users that can access the third-party vehicle cloud service;
   transmitting, by the third-party vehicle cloud service, to the vehicle management module an authentication that the one end user associated with the mobile client device can access the third-party vehicle cloud service;
   transmitting, by the vehicle management module, a vehicle access invitation to the mobile client device, wherein the vehicle access invitation authorizes access to the vehicle; and
   synchronizing, by a synchronization module, a directory service according to the vehicle access invitation, wherein the directory service associated with the vehicle cloud service.

2. The method for managing a vehicle cloud service of claim 1 further including:
   transmitting, by the client device, an invitation acceptance; and
   synchronizing, by the synchronization module, the directory service according to the invitation acceptance.

3. The method for managing a vehicle cloud service of claim 2 further comprising:
   determining that the invitation acceptance exceeds the upper limit of end users; and
   denying access to the cloud service.

4. The method for managing a vehicle cloud service of claim 2 further comprising:
   determining that the invitation acceptance does not exceed the upper limit of end users; and
   authorizing access to the cloud service.

5. The method for managing a vehicle cloud service of claim 1 further including:
   transmitting, by the client device, an invitation declination; and
   synchronizing, by the synchronization module, the directory service according to the invitation declination.

6. The method for managing a vehicle cloud service of claim 1 wherein the vehicle access invitation includes a time period, and wherein the invitation is invalid upon expiration of the time period.

7. The method for managing a vehicle cloud service of claim 1 further comprising:
   querying, by the vehicle management module, the client device to request a release allowing the cloud management module to one of: use, copy, and share any information received from the client device; and
   transmitting, by the client device, a message including the release according to user input.

8. The method for managing a vehicle cloud service of claim 7 further comprising:
   unlocking, by the vehicle, at least one lockable feature of the vehicle when the vehicle management module receives the release.

9. The method for managing a vehicle cloud service of claim 1 further comprising:
   determining, by the vehicle cloud service, a community of end users that can access the vehicle cloud service and an upper limit of end users that can access the vehicle cloud service according to a per-seat license;
   wherein the vehicle access invitation authorizes the per-seat license associated with the vehicle cloud service.

10. The method for managing a vehicle cloud service of claim 1 further comprising loading, by the vehicle, vehicle settings associated with the user profile in response to receiving the vehicle access invitation.

11. A system for managing a vehicle cloud service comprising:
   a third-party network component having a third-party vehicle cloud service operating thereon, wherein the third-party vehicle cloud service includes a community of end users that can access the third-party vehicle cloud service, and wherein the third-party network component is communicatively coupled to a network;
   a vehicle associated with a vehicle management module that controls access to the vehicle, the vehicle management module communicatively coupled to the network;
   a third-party directory service associated with the third-party vehicle cloud service, wherein the third-party directory service manages the community of end users that can access the third-party vehicle cloud service, wherein a subset of end users of the community of end users request access to the vehicle;
   a vehicle directory service associated with the vehicle cloud service;
   a mobile client device associated with one end user of the subset of end users, the mobile client device communicatively coupled to the network, wherein the mobile client device is associated with a user profile having a plurality of user preferences and at least one user credential indicating the end user has a valid driving license;
   an identifying message originating from the mobile client device, in which the identifying message includes a vehicle access request, the user profile, the user preferences, and the user credential indicating the end user has a valid driving license;
   a query originating from the vehicle management module that requests vehicle access authorization from the third-party vehicle cloud service when the vehicle access request is received from the mobile client device;
   a vehicle access invitation, originating from the vehicle cloud service, that is transmitted to the mobile client device when the identifying message is authenticated by the third-party vehicle cloud service, wherein the vehicle access invitation provides access to the vehicle; and
   a synchronization module that synchronizes the third-party directory service and the vehicle directory service according to the vehicle access invitation.

12. The system for managing a vehicle cloud service of claim 11 further including:
   an invitation acceptance originating from the mobile client device; and
   wherein the synchronization module synchronizes the third-party directory service and the vehicle directory service according to the invitation acceptance.

13. The system for managing a vehicle cloud service of claim 12 wherein the vehicle management module determines from one of the third-party directory service and the vehicle directory service that the invitation acceptance exceeds an upper limit of end users that can access the third-party vehicle cloud service and denies access to the third-party vehicle cloud service.

14. The system for managing a vehicle cloud service of claim 12 wherein the vehicle management module determines from one of the third-party directory service and the vehicle directory service that the invitation acceptance does not exceed an upper limit of end users that can access the third-party vehicle cloud service and authorizes access to the third-party vehicle cloud service.

15. The system for managing a vehicle cloud service of claim 11 further including:
   an invitation declination originating from the client device; and
   wherein the synchronization module synchronizes the third-party directory service and the vehicle directory service according to the invitation declination.

16. The system for managing a vehicle cloud service of claim 11 wherein the vehicle access invitation includes a time period, and wherein the invitation is invalid upon expiration of the time period.

17. The system for managing a vehicle cloud service of claim 11 further comprising a query originating from the third-party vehicle cloud service, wherein the query requests a release allowing the third-party vehicle cloud service to one of: use, copy, and share any information received from the client device; and
   a message originating from the mobile client device in response to user input, wherein the responsive message includes the release.

18. The system for managing a vehicle cloud service of claim 17 wherein the vehicle further comprises at least one lockable feature that is unlocked and made accessible when the release is received by the third-party vehicle cloud service.

19. The system for managing a vehicle cloud service of claim 11 further comprising:
   a per-seat license associated with the third-party vehicle cloud service that includes an end date for the per-seat license;
   wherein one of the third-party directory service and the vehicle directory service manages the per-seat license associated with the vehicle cloud service;
   wherein the vehicle access invitation authorizes the per-seat license associated with the vehicle cloud service; and
   wherein the synchronization module synchronizes one of the third-party directory service and the vehicle directory service according to the vehicle access invitation so that an upper limit of the per-seat license is not exceeded.

20. The system for managing a vehicle cloud service of claim 11 wherein the user profile further comprises vehicle settings; and
   wherein the vehicle access invitation loads the vehicle settings of the user profile onto the one or more vehicle.

* * * * *